United States Patent
Naito

(10) Patent No.: US 7,215,818 B2
(45) Date of Patent: May 8, 2007

(54) IMAGE COMPRESSION CODING APPARATUS AND CONTROL METHOD THEREFOR

(75) Inventor: Satoshi Naito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 675 days.

(21) Appl. No.: 10/379,655

(22) Filed: Mar. 6, 2003

(65) Prior Publication Data

US 2003/0169934 A1 Sep. 11, 2003

(30) Foreign Application Priority Data

| Mar. 7, 2002 | (JP) | ............................. 2002/062304 |
| Feb. 4, 2003 | (JP) | ............................. 2003/027607 |

(51) Int. Cl.
*G06K 9/36* (2006.01)
*G06K 9/46* (2006.01)

(52) U.S. Cl. .................................................. 382/239

(58) Field of Classification Search ................. 382/239
See application file for complete search history.

(56) References Cited

U.S. PATENT DOCUMENTS

| 5,291,282 | A | | 3/1994 | Nakagawa et al. ......... 348/384 |
| 5,543,844 | A | | 8/1996 | Mita et al. ................... 348/405 |
| 5,832,126 | A | * | 11/1998 | Tanaka ........................ 382/239 |
| 5,991,515 | A | * | 11/1999 | Fall et al. ................... 358/1.15 |
| 6,061,473 | A | * | 5/2000 | Chen et al. ................. 382/235 |
| 6,195,024 | B1 | * | 2/2001 | Fallon ........................... 341/51 |
| 6,301,392 | B1 | * | 10/2001 | Acharya ..................... 382/239 |
| 6,552,819 | B2 | * | 4/2003 | Osawa et al. .............. 358/1.17 |

FOREIGN PATENT DOCUMENTS

| JP | 8-32037 B2 | 3/1996 |
| JP | 2523953 B2 | 8/1996 |
| JP | 2897563 B2 | 5/1999 |
| JP | 3038022 B2 | 5/2000 |

OTHER PUBLICATIONS

"60 to 140 Mbps Complaint HDTV Codec", Video Information, vol. 24, No. 1, Jan. 1992, pp. 51-58.

* cited by examiner

*Primary Examiner*—Wenpeng Chen
*Assistant Examiner*—Yuzhen Ge
(74) *Attorney, Agent, or Firm*—Fitzpatrick, Cella, Harper & Scinto

(57) ABSTRACT

An image compression coding apparatus which can obtain coded data with minimum coding distortion within an allowable compression ratio range while minimizing a deterioration in the performance of a system, and a control method for the apparatus.

6 Claims, 27 Drawing Sheets

IMAGE COMPRESSION CODING APPARATUS AND CONTROL METHOD THEREFOR

FIELD OF THE INVENTION

The present invention relates to an image compression coding apparatus which compression-codes an input image with a proper data amount and a control method for the apparatus.

BACKGROUND OF THE INVENTION

Currently, many digital imaging devices incorporate compression coding processing functions for still images. So-called digital cameras and the like are typical among these digital imaging devices. A digital color copying machine is one of the digital imaging devices incorporating compression coding processing functions.

In a digital color copying machine, the original reading unit incorporates a compression coding processing function for read original image data in order to reduce the amount of data transferred from the original reading unit to the printing unit when the read original image data is transferred. The printing unit incorporates a decompression/decoding processing function for compression-coded original image data.

The data amount of the coded original image data generated by the compression coding processing unit provided on the output stage of the original reading unit can be reduced to about one-severalth to one-ten-oddth of the data amount of the original image data before compression coding processing, i.e., the original image data that has only been read.

With regard to a reduction degree for the data amount of original image data before a coded original image data is compression-coded, i.e., an allowable compression ratio upper limit, a value at which it is not easy to visually recognize coding distortion from reconstructed image data obtained by decompression/decoding processing is set as an allowable upper limit.

An allowable lower limit of the above compression ratios is uniquely determined by various system parameters in the system, such as the maximum data amount of original image data that can be read by the original reading unit per unit time and the maximum data transfer amount of compression-coded original image data when they are transferred from the original reading unit to the printing unit.

Even if allowable compression ratio upper and lower limits are set in this manner, it is not easy to perform compression coding processing such that the compression ratios for all original image data supplied fall within that range. This is because even if compression coding processing is performed by using identical coding parameters represented by quantization tables, the data amounts of the resultant coded original image data vary depending on the original image data. In other words, read original image data vary in compression ratio for each original.

This is because every read original image data differs in deviation in terms of spatial frequency and its degree, and various techniques for minimizing the redundancy of compression-coded image data are used in compression coding processing for such original image data, including runlength coding for transform coefficients whose values are 0 and entropy coding using variable-length codes.

In order to perform compression coding processing such that compression ratios for all original image data fall within the range between the allowable upper limit and the allowable lower limit, coding parameters to be applied to the respective data to be compression-coded, i.e., the respective original image data to be supplied, must be adaptively changed.

To perform compression coding processing at a constant compression ratio, coding control called information amount control or code amount control must be implemented. Practical methods of implementing the above information amount control are roughly classified into two known methods: a feedforward method and feedback method.

In the feedforward method, before compression coding processing, a dynamic range, power, and various statistical information are calculated from original image data input as data to be compression-coded, and an optimal coding parameter is predicted on the basis of the calculated values. Thereafter, actual compression coding processing is performed by using the obtained coding parameter. In contrast to this, in the feedback method, after an optimal coding parameter is predicted from the actually measured coded data amount obtained by performing trial compression coding processing, final compression coding processing is performed by using the obtained coding parameter.

Of these methods, the feedback method of predicting an optimal coding parameter from the actually measured value of the coded data amount obtained by trial compression coding processing can obtain a predictive value of a coding parameter for the generation of a coded data amount with higher precision than in the feedforward method, because the feedback method directly uses an actually obtained coded data amount for the calculation of a predictive value. Theoretically, however, this feedback method takes more time overhead spent for trial compression coding processing.

In contrast to this, a trial algorithm can be repeatedly applied a finite number of times to a system which can tolerate an increase in processing time due to the repetition of compression coding processing for one original image data until a coded data is obtained at a target compression ratio, i.e., a system that is not required to have very high real-time operability and performance (e.g., Japanese Patent Publication No. 8-32037).

In general, however, a digital imaging device such as a digital camera or digital color copying machine is required to have high real-time operability and performance. It is therefore important for the device to minimize the time overhead spent for trial compression coding processing for the prediction of an optimal coding parameter. In addition, sufficiently high prediction precision is required for the device.

It is readily anticipated that the prediction precision of an optimal coding parameter in information amount control using the feedback method can be effectively improved by performing trial compression coding processing by using many different coding parameters a plural number of times and increasing the number of combinations of the coding parameters and the actually measured values of coded data amounts that are actually obtained.

In order to minimize the time overhead, this device needs to have arithmetic circuits or processing circuits equal in number to coding parameters used for trial compression coding processing, and some contrivance is required to, for example, perform trial compression coding processing at high speed by operating these circuits in parallel. Several techniques have been proposed to solve such a problem. As one of the techniques, a technique associated with parallel circuit architectures is known (e.g., "60 to 140 Mbps Compliant HDTV Codec" (Video Information, January 1992, p. 51 to 58)).

According to the above reference, for example, an optimal coding parameter, i.e., an optimal quantization table, can be obtained by performing curve approximation on the basis of N coded data amounts obtained from a compression coding apparatus having N quantization circuits and N generated code amount measurement circuits by using N quantization tables as a plurality of coding parameters.

A technique of suppressing an increase in circuit size with a similar arrangement has also been proposed (for example, Japanese Patent No. 2523953). According to this reference, three quantization circuits are provided to concurrently perform quantizing operations using five quantization tables in trial compression coding processing, thereby calculating five coded data amount values.

Assume that one image data is to be compression-coded. In this case, in moving image compression coding using a coding scheme capable of sequentially proceeding with compression coding processing while adaptively changing a coding parameter, and more specifically, a scaling value for a quantization table, an algorithm for sequentially correcting a coding parameter in an image compression coding apparatus can be used (see, for example, Japanese Patent No. 2897563).

According to Japanese Patent No. 2897563, in trial compression coding processing, the data amount of coded data obtained by quantization using a specific quantization scaling value is calculated on a block basis. The data amount of M coded data which is expected to be obtained by using M quantization scale values is predicted on the basis of the calculated data amount. This apparatus proceeds with compression coding processing while sequentially correcting the actually used quantization scaling value on the basis of the difference between the target coded data amount calculated from the M predictive values and the cumulative value of the data amounts of coded data which have been actually output up to the current time point, i.e., a prediction error.

There is also disclosed a technique used in an electronic camera apparatus (see, for example, Japanese Patent No. 3038022) in which in order to prevent the amount of coded data that are actually generated from exceeding an allowable upper limit against prediction, when the data amount of coded data actually obtained by quantization and variable-length coding using the quantization step value derived from the coded data amount obtained in trial compression coding processing exceeds the data amount assigned on a block basis, the variable-length coding for the corresponding block is aborted (significant transform coefficient information is discarded).

The above conventional techniques in information amount control using the feedback method are common in that an optimal coding parameter and a coded data amount predictive value to be generated by the coding parameter are derived on the basis of one or a plurality of actually measured coded data amounts obtained by trial compression coding processing.

In the JPEG coding scheme currently widely used as a general still image compression coding scheme, only one combination of values in a quantization step value matrix, i.e., a quantization table, which is one of the most representative coding parameters is commonly applied to all the blocks constituting one data to be compression-coded.

Provided that a still image compression coding scheme like the one described above with a limitation being imposed on the degree of freedom of coding parameters is used, the above algorithm for sequentially correcting a coding parameter cannot be used in any of the above conventional techniques.

According to the above algorithm disclosed in Japanese Patent No. 3038022, when the data amount of a coded data exceeds a data amount assigned per block, the variable-length coding for the block is aborted. Even if, therefore, the data amount of the final coded data obtained upon completion of compression coding processing for all the blocks constituting image data does not exceed an allowable upper limit, even a significant transform coefficient that need not be discarded is discarded. As a consequence, local variations in compression coding distortion occur in a reconstructed image obtained by decompression/decoding processing, and hence it is not preferable to apply such compression coding processing to a digital imaging device.

According to the above description, when a still image compression coding scheme with a limitation being imposed on the degree of freedom of coding parameters, such as the JPEG coding scheme, is to be used for a digital imaging device, it is optimal that compression coding operations are simultaneously performed by using different coding parameters by increasing the number of parallel operations within an allowable circuit size range, and one of the resultant coded data which exhibits the least coding distortion within an allowable compression ratio range is output. However, as the number of parallel operations increases, the overhead in transferring and storing coded data in a memory through a transmission path increases, resulting in a deterioration in system performance.

There is also available a method of determining a new coding parameter at the time point a coded data exceeds a compression ratio range and redoing compression coding processing from the start of data to be coded instead of increasing the number of parallel operations. However, the time spent for this redoing, i.e., re-coding processing, directly leads to a deterioration in system performance.

SUMMARY OF THE INVENTION

The present invention has been proposed to solve the conventional problems, and has as its object to provide an image compression coding apparatus and a control method for the apparatus. According to the image compression coding apparatus and the control method for the apparatus of the present invention, in a system like a digital imaging device which is required to have high real-time operability and performance, when compression coding processing is to be performed while information amount control using a feedback technique with high prediction precision is realized, a coded data with the minimum coding distortion within an allowable compression ratio range can be obtained while a deterioration in the performance of the system is minimized.

In order to achieve the above object, according to the present invention, there is provided an image compression coding apparatus comprising block formation means for dividing input image data into blocks each having a predetermined size, compression coding means for compression-coding the image data for each divided block on the basis of a plurality of compression coding parameters and outputting a plurality of coded data, coded data amount accumulation means for calculating cumulative data amounts of the plurality of coded data for the respective compression-coded blocks, upper limit setting means for setting a total coded data amount upper limit for input image data, minimum total coded data amount prediction means for calculating minimum total coded data amount predictive values of the plurality of coded data, which are to be obtained when the image data is completely compression-coded, on the basis of a minimum coded data amount per a predetermined number of blocks and the cumulative data amounts, and control means for, when the minimum total coded data amount predictive value exceeds the upper value, aborting compression coding processing with a corresponding compression coding parameter.

An image compression coding apparatus according to the present invention is comprising block formation means for dividing input image data into blocks each having a predetermined size, compression coding means for compression-coding the image data for each divided block on the basis of a plurality of compression coding parameters and outputting a plurality of coded data, coded data amount accumulation means for calculating cumulative data amounts of the plurality of coded data for the respective compression-coded blocks, upper limit setting means for setting a total coded data amount upper limit for input image data, threshold calculation means for sequentially calculating a threshold not more than the upper limit on the basis of the upper limit, a minimum coded data amount per a predetermined number of blocks, and the number of compression-coded blocks, and control means for, when the cumulative data amount exceeds the threshold, aborting compression coding processing with a corresponding compression coding parameter.

An image compression coding apparatus according to the present invention is comprising block formation means for dividing input image data into blocks each having a predetermined size, compression coding means for compression-coding the image data for each divided block on the basis of a plurality of compression coding parameters and outputting a plurality of coded data, re-compression coding means for re-compression-coding the coded data, coded data amount accumulation means for calculating cumulative data amounts of the plurality of coded data for the respective compression-coded blocks, upper limit setting means for setting a total coded data amount upper limit for input image data, minimum total coded data amount prediction means for calculating minimum total coded data amount predictive values of the plurality of coded data, which are to be obtained when the image data is completely compression-coded, on the basis of a minimum coded data amount per a predetermined number of blocks and the cumulative data amounts, and control means for, when the minimum total coded data amount predictive value and the sum of the cumulative data amounts exceed the upper limit, changing the compression coding parameter used by the compression coding means and causing the re-compression coding means to perform re-compression coding.

An image compression coding apparatus according to the present invention is comprising block formation means for dividing input image data into blocks each having a predetermined size, compression coding means for compression-coding the image data for each divided block on the basis of a plurality of compression coding parameters and outputting a plurality of coded data, re-compression coding means for re-compression-coding the coded data, coded data amount accumulation means for calculating a cumulative data amount of the coded data for a compression-coded block, upper limit setting means for setting a total coded data amount upper limit for input image data, threshold calculation means for sequentially calculating a threshold not more than the upper limit on the basis of the upper limit, a minimum coded data amount per a predetermined number of blocks, and the number of compression-coded blocks, and control means for, when the cumulative data amount exceeds the threshold, changing the compression coding parameter used by the compression coding means and causing the re-compression coding means to perform re-compression coding.

An image compression coding apparatus according to the present invention is comprising block formation means for dividing input image data into blocks each having a predetermined size, compression coding means for compression-coding the image data for each divided block on the basis of a plurality of compression coding parameters and outputting a plurality of coded data, coded data amount accumulation means for calculating cumulative data amounts of the plurality of coded data for the respective compression-coded blocks, upper limit setting means for setting a total coded data amount upper limit for input image data, maximum total coded data amount prediction means for calculating maximum total coded data amount predictive values of the plurality of coded data, which are to be obtained when the image data is completely compression-coded, on the basis of a maximum coded data amount per a predetermined number of blocks and the cumulative data amounts, and control means for, when the cumulative data amount exceeds the upper limit, performing processing to abort compression coding processing with a corresponding compression coding parameter, and when the maximum total coded data amount predictive value does not exceed the upper limit, performing processing to abort compression coding processing with a compression coding parameter higher in compression ratio than a corresponding compression coding parameter.

An image compression coding apparatus according to the present invention is comprising block formation means for dividing input image data into blocks each having a predetermined size, compression coding means for generating coded data by compression-coding the image data for each divided block at a first compression ratio and a second compression ratio higher than the first compression ratio, coded data amount accumulation means for calculating a cumulative data amount of coded data generated at the first compression ratio for each compression-coded block, storage means for storing coded data generated at the second compression ratio, upper limit setting means for setting a total coded data amount upper limit for input image data, maximum total coded data amount prediction means for calculating a maximum total coded data amount predictive value of image data, which is to be obtained when non-compression-coded blocks of the image data are compression-coded at the second compression ratio, on the basis of a maximum coded data amount per a predetermined number of blocks and the cumulative data amount, re-compression coding means for re-compression-coding coded data stored in the storage means at a predetermined compression ratio, and control means for, when the cumulative data amount exceeds the upper limit and the maximum total coded data amount predictive value exceeds the upper limit, performing compression coding processing for the image data upon setting the second compression ratio to a first compression ratio and a third compression ratio higher than the second compression ratio to a second compression ratio, and causing the re-compression coding means to perform re-compression coding at the third compression ratio, and when the cumulative data amount exceeds the upper limit and the maximum total coded data amount predictive value does not exceed the upper limit, aborting compression coding processing at the first compression ratio, performing only compression coding processing at the second compression ratio, and inhibiting the re-compression coding means from performing re-compression coding.

An image compression coding apparatus according to the present invention is comprising block formation means for dividing input image data into blocks each having a predetermined size, compression coding means for compression-coding the image data for each divided block on the basis of a plurality of compression coding parameters and outputting a plurality of coded data, coded data amount accumulation means for calculating cumulative data amounts of the plurality of coded data for the respective compression-coded blocks, upper limit setting means for setting a total coded data amount upper limit for input image data, minimum total coded data amount prediction means for calculating minimum total coded data amount predictive values of the plurality of coded data, which are to be obtained when the image data is completely compression-coded, on the basis of a minimum coded data amount per a predetermined number of blocks and the cumulative data amounts, maximum total coded data amount prediction means for calculating maximum total coded data amount predictive values of the plurality of coded data, which are to be obtained when the image data is completely compression-coded, on the basis of a maximum coded data amount per a predetermined number of blocks and the cumulative data amounts, and control means for, when the minimum total coded data amount predictive value exceeds the upper limit, performing processing to abort compression coding processing with a corresponding compression coding parameter, and when the maximum total coded data amount predictive value does not exceed the upper limit, performing processing to abort compression coding processing with a compression coding parameter higher in compression ratio than a corresponding compression coding parameter.

An image compression coding apparatus according to the present invention is comprising block formation means for dividing input image data into blocks each having a predetermined size, compression coding means for compression-coding the image data for each divided block on the basis of a plurality of compression coding parameters and outputting a plurality of coded data, coded data amount accumulation means for calculating cumulative data amounts of the plurality of coded data for the respective compression-coded blocks, upper limit setting means for setting a total coded data amount upper limit for input image data, threshold calculation means for sequentially calculating a threshold not more than the upper limit on the basis of the upper limit, a minimum coded data amount per a predetermined number of blocks, and the number of compression-coded blocks, maximum total coded data amount prediction means for calculating maximum total coded data amount predictive values of the plurality of coded data, which are to be obtained when the image data is completely compression-coded, on the basis of a maximum coded data amount per a predetermined number of blocks and the cumulative data amounts, and control means for, when the cumulative data amount exceeds the threshold, performing processing to abort compression coding processing with a corresponding compression coding parameter, and when the maximum total coded data amount predictive value does not exceed the upper limit, performing processing to abort compression coding processing with a compression coding parameter higher in compression ratio than a corresponding compression coding parameter.

An image compression coding apparatus according to the present invention is comprising block formation means for dividing input image data into blocks each having a predetermined size, compression coding means for generating coded data by compression-coding the image data for each divided block at a first compression ratio and a second compression ratio higher than the first compression ratio, coded data amount accumulation means for calculating a cumulative data amount of coded data generated at the first compression ratio for each compression-coded block, storage means for storing coded data generated at the second compression ratio, upper limit setting means for setting a total coded data amount upper limit for input image data, threshold calculation means for sequentially calculating a threshold not more than the upper limit on the basis of the upper limit, a minimum coded data amount per a predetermined number of blocks, and the number of compression-coded blocks, maximum total coded data amount prediction means for calculating a maximum total coded data amount predictive value of image data, which is to be obtained when non-compression-coded blocks of the image data are compression-coded at the second compression ratio, on the basis of a maximum coded data amount per a predetermined number of blocks and the cumulative data amount, re-compression coding means for re-compression-coding coded data stored in the storage means at a predetermined compression ratio, and control means for, when the cumulative data amount exceeds the threshold and the maximum total coded data amount predictive value exceeds the upper limit, performing compression coding processing for the image data upon setting the second compression ratio to a first compression ratio and a third compression ratio higher than the second compression ratio to a second compression ratio, and causing the re-compression coding means to perform re-compression coding at the third compression ratio, and when the cumulative data amount exceeds the upper limit and the maximum total coded data amount predictive value does not exceed the upper limit, aborting compression coding processing at the first compression ratio, performing only compression coding processing at the second compression ratio, and inhibiting the re-compression coding means from performing re-compression coding.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

Figure 16:
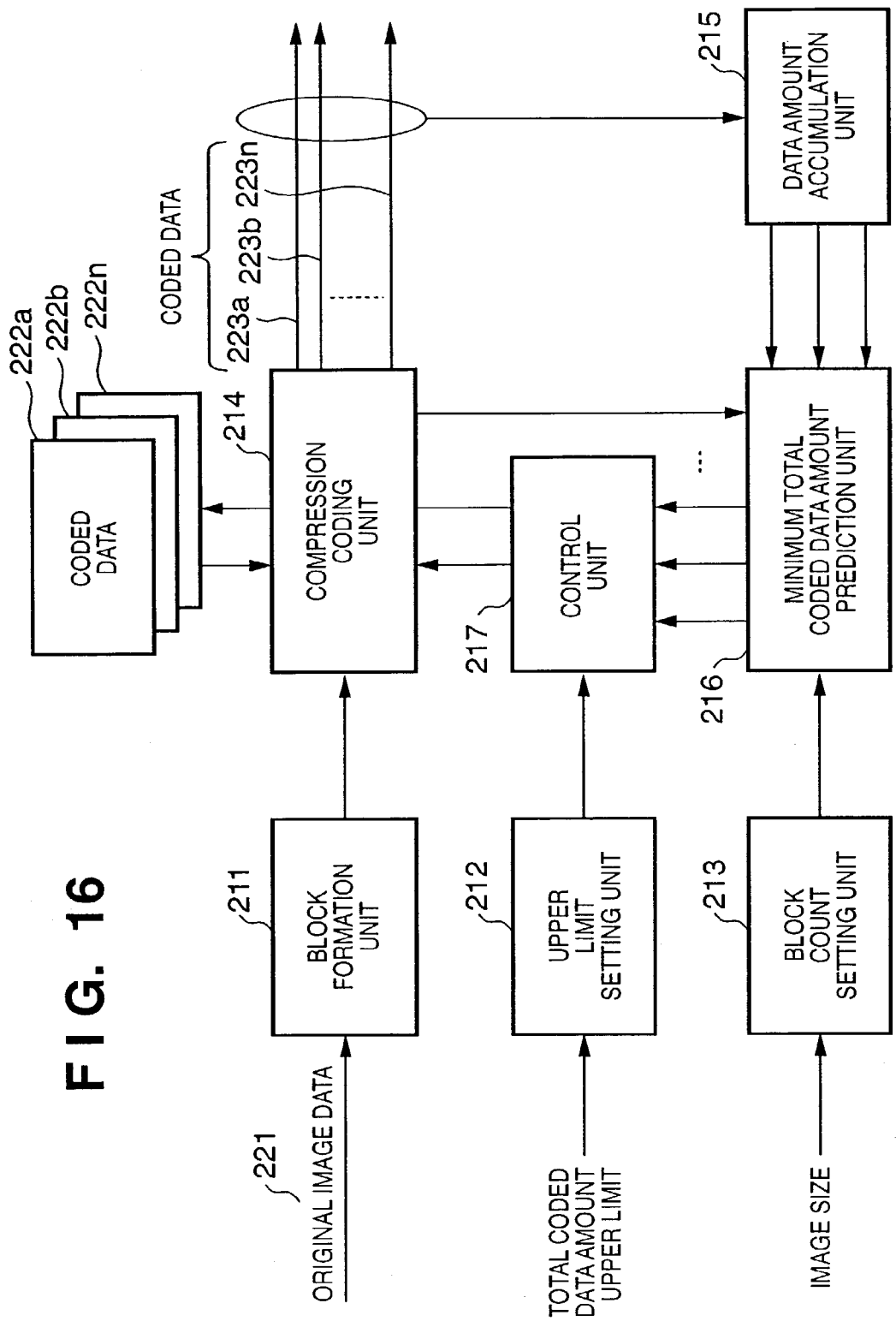
FIG. 16 is a block diagram showing the arrangement of an image compression coding apparatus according to the first embodiment of the present invention.

FIG. 16 is a block diagram showing the arrangement of an image compression coding apparatus according to the first embodiment of the present invention. The image compression coding apparatus according to this embodiment is comprised of a block formation unit 211 (block formation means), upper limit setting unit 212 (upper limit setting means), block count setting unit 213 (block count setting means), compression coding unit 214 (compression coding means), data amount accumulation unit 215 (data amount accumulation means), minimum total coded data amount prediction unit 216 (minimum total coded data amount prediction means), and control unit 217 (control means).

The block formation unit 211 divides original image data 221 input to the image compression coding apparatus of this embodiment into blocks each having a predetermined size, and outputs them to the compression coding unit 214. The total coded data amount upper limit obtained when block-divided original image data completely coded is set in the upper limit setting unit 212. The block count setting unit 213 holds a block count as an image size which is determined in accordance with the size of original image data and the size of each block.

The compression coding unit 214 compression-codes the block-divided original image data by using a plurality of coding parameters 222a to 222n, and outputs a plurality of coded data 223a to 223n. The data amount accumulation unit 215 accumulates the data amounts of the coded data 223a to 223n to calculate a cumulative data amount.

The minimum total coded data amount prediction unit 216 calculates a non-compressed block count N from the block count set in the block count setting unit 213 and the number of blocks coded by the compression coding unit 214. The minimum total coded data amount prediction unit 216 then obtains a minimum total coded data amount predictive value P from a minimum code amount L per block, the non-compressed block count N, and a cumulative data amount D calculated by the data amount accumulation unit 215 by using equation (1):

$$P = D + L \times N \quad (1)$$

In this case, the minimum total coded data amount prediction unit 216 calculates minimum total coded data amount predictive values Pa to Pn corresponding to the coding parameters 222a to 222n, respectively.

The control unit 217 compares the minimum total coded data amount predictive values Pa to Pn calculated by the minimum total coded data amount prediction unit 216 with the total coded data amount upper limit set in the upper limit setting unit 212. If there is any predictive value that exceeds the upper limit, the control unit 217 controls the compression coding unit 214 to abort compression coding processing with the coding parameter used to generate the corresponding coded data. This is because it is obvious that when the minimum total coded data amount predictive value exceeds the upper limit, the cumulative data amount of coded data obtained by coding subsequent original image tiles will exceed the total coded data amount upper limit.

A method of calculating the minimum coded amount per block will be described below by exemplifying the JPEG coding scheme widely used for compression coding of still images. When, for example, an image constituted by only white pixels is JPEG-coded, the difference value between the DC components of adjacent blocks of the DC components obtained by frequency-transforming the image by a DCT is 0. In this case, a Huffman code is 2-bit data "00". In addition, all AC components are 0 and expressed by EOBs. An EOB Huffman code is 4-bit data "1010". Therefore, the minimum code amount per block is six bits.

The minimum code amount also depends on the number of small blocks which constitute a block-divided original image and each of which serves as a unit of DCT in JPEG, the number of components, and the number of samples. This amount further depends on the number of marker codes such as EOI markers, restart markers, and headers as well as a JPEG ECS coding unit. When data that has been divided into blocks and compression-coded is to be formed into packets and a header is to be added to each packet, the size of each packet is also associated with the minimum code amount. Therefore, the minimum code amount per block becomes larger than six bits and depends on the specifications of a system including the image compression coding apparatus.

Figure 17:
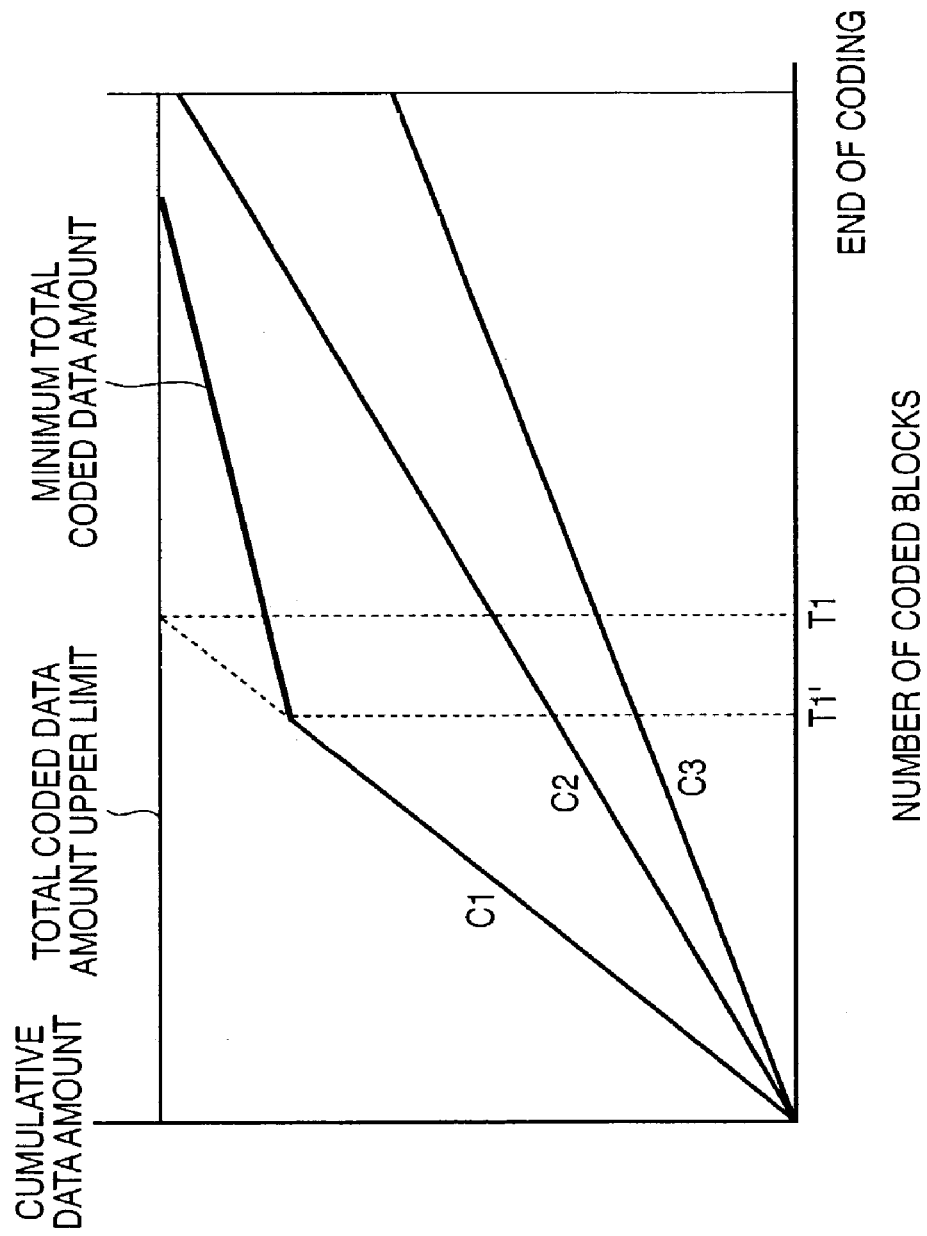
FIG. 17 is a graph for explaining the relationship between the total coded data amount upper limit set in an upper limit setting unit 212 in the image compression coding apparatus according to the first embodiment, the cumulative data amount (ordinate) of coded data generated by a compression coding unit 214, and the relative position (abscissa) of a block of original image data which has already been compression-coded.

FIG. 17 is a graph for explaining the relationship between the total coded data amount upper limit set in the upper limit setting unit 212 in the image compression coding apparatus according to the first embodiment, the cumulative data amount (ordinate) of coded data generated by the compression coding unit 214, and the relative position (abscissa) of a block of original image data which has already been compression-coded.

Referring to FIG. 17, reference symbol T1 denotes the number of blocks that had been coded by the time the cumulative data amount of a coded data C1 reached the total coded data amount upper limit; and T1', the number of blocks that had been coded by the time the minimum total coded data amount predictive value of the coded data C1 reached the total coded data amount upper limit.

In the image compression coding apparatus according to this embodiment, when the coded data C1 is generated up to a block T1' and the minimum total coded data amount predictive value exceeds the total coded data amount upper limit, coding processing for C1 is aborted. That is, the coding processing is aborted earlier than when the cumulative data amount of coded data exceeds the total coded data amount upper limit.

Figure 5:
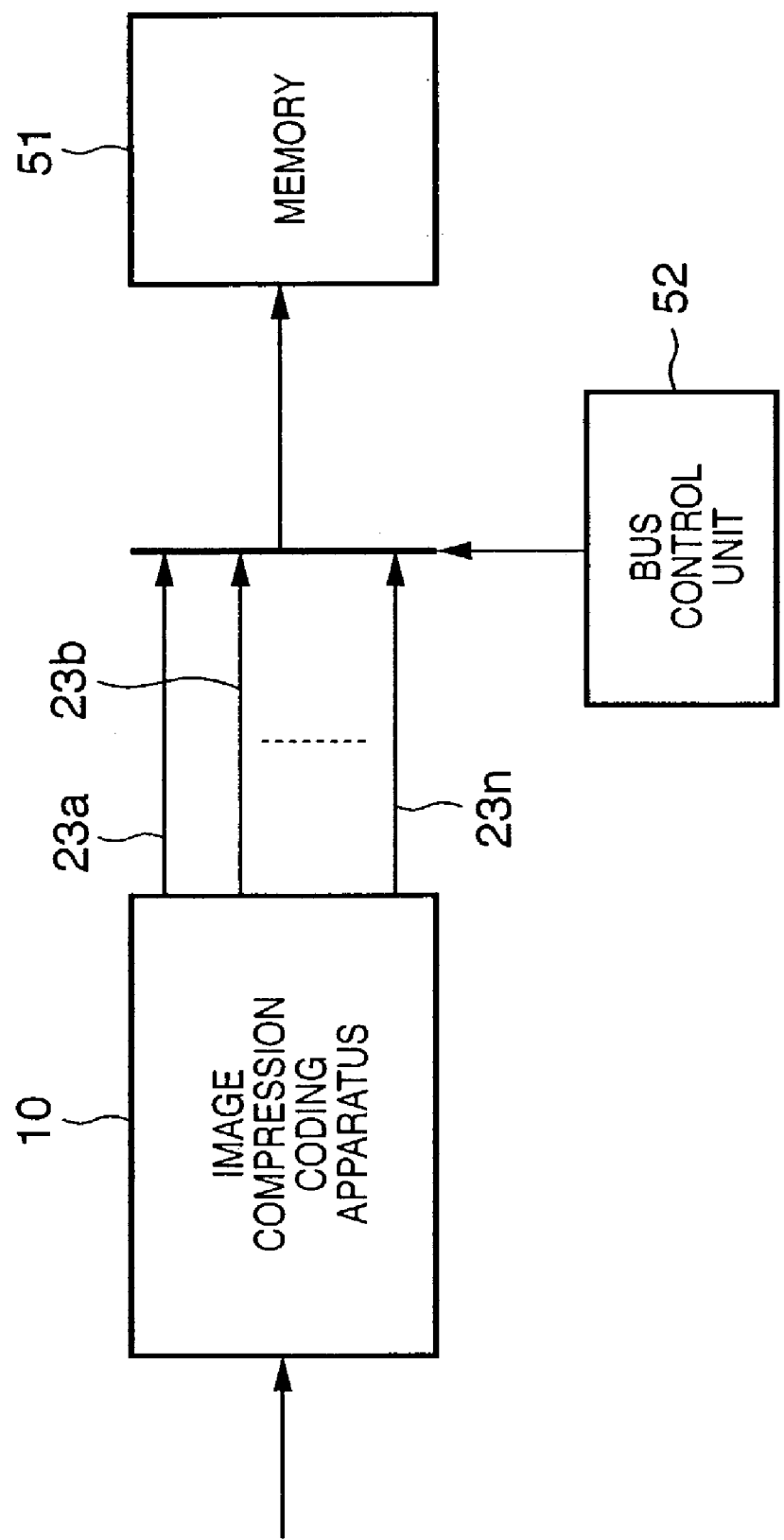
FIG. 5 is a schematic view for explaining how the image compression coding apparatus according to the first or second embodiment is connected to a memory for storing coded data in an external system.

FIG. 5 is a schematic view for explaining how the image compression coding apparatus according to the first embodiment is connected to a memory for storing coded data in an external system. Coded data 23a to 23n output from an image compression coding apparatus 10 according to this embodiment are transferred to a memory 51 via a bus controlled by a bus control unit 52. In the system including the image compression coding apparatus according to this embodiment, a coded data whose cumulative data amount does not exceed the total coded data amount upper limit and is nearest thereto is stored as the compression-coded data of the original image in the memory 51, and coded data other than the stored data are discarded.

In the system shown in FIG. 5, as the number of coded data increases, overhead in transfer to the memory increases. The image compression coding apparatus must temporarily interrupt compression coding during a wait for memory transfer. As a consequence, the time required for image compression coding increases. In this case, as described above, if coding processing is aborted when the minimum total coded data amount predictive value calculated on the basis of the minimum code amount per block and the relative position of a block of the original image exceeds the total coded data amount upper limit, any coded data whose cumulative data amount will apparently exceed the total coded data amount upper limit is not transferred to the memory. This makes it possible to suppress a decrease in overhead accompanying data transfer outside the image compression coding apparatus.

As described above, in the image compression coding apparatus according to the first embodiment, when the minimum total coded data amount predictive value calculated on the basis of the minimum code amount per block and the relative position of a block of an original image exceeds the total coded data amount upper limit, compression coding processing with the corresponding compression coding parameter is aborted.

Since the coding processing is aborted before the cumulative data amount of a coded data which will apparently exceed the total coded data amount upper limit exceeds the total coded data amount upper limit, the overhead in a case wherein coded data with different compression ratios are concurrently output and transferred to an external memory or the like via a transmission path can be reduced. This makes it possible to increase the processing speed of compression coding while realizing information amount control.

<Second Embodiment>

Figure 1:
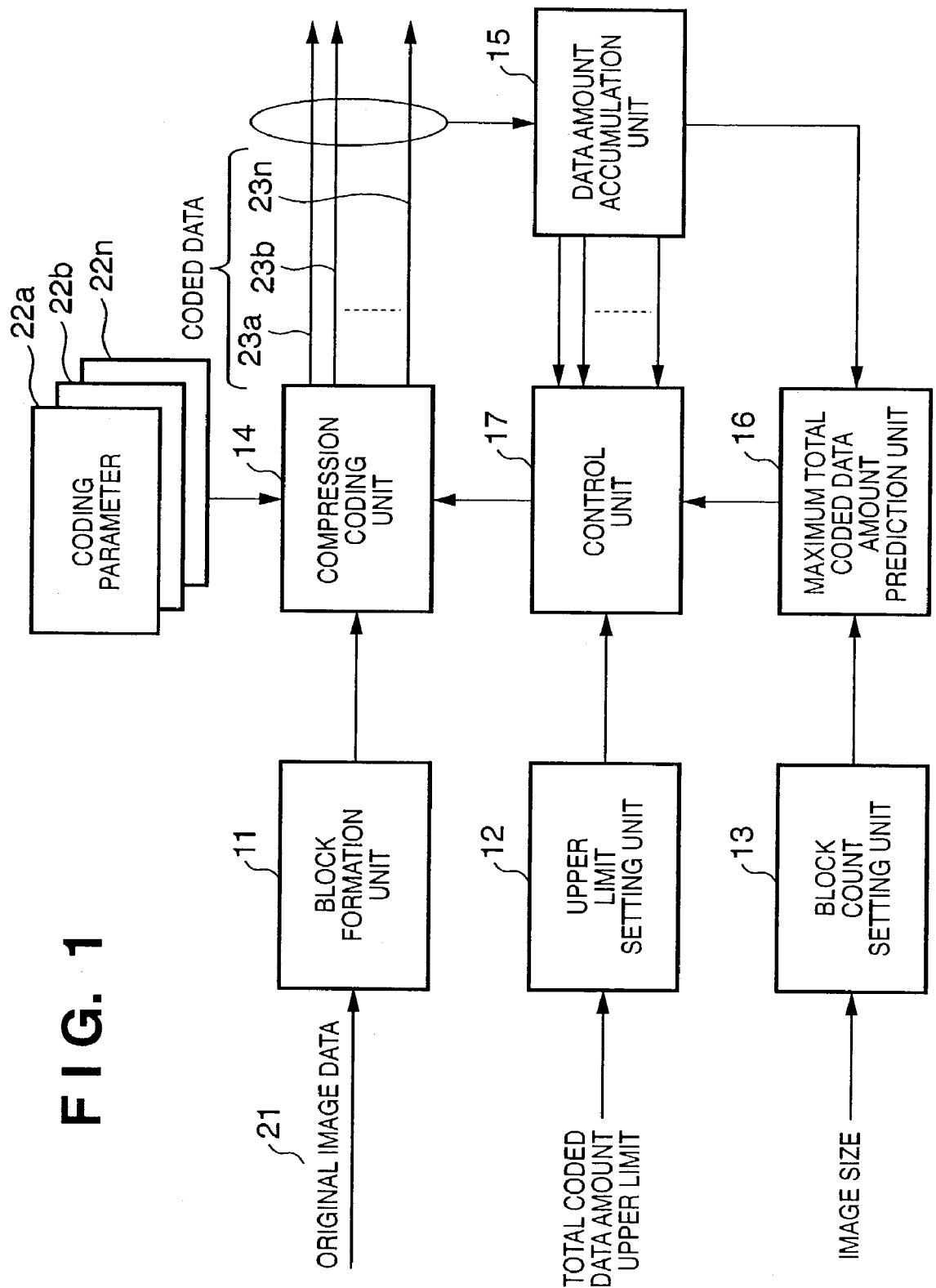
FIG. 1 is a block diagram showing the arrangement of an image compression coding apparatus according to the second embodiment of the present invention.

FIG. 1 is a block diagram showing the arrangement of an image compression coding apparatus according to the second embodiment of the present invention. As shown in FIG. 1, the image compression coding apparatus according to this embodiment is comprised of a block formation unit 11 (block formation means), upper limit setting unit 12 (upper limit setting means), block count setting unit 13 (block count setting means), compression coding unit 14 (compression coding means), data amount accumulation unit 15 (coded data accumulation means), maximum coded data amount prediction unit 16 (maximum coded data amount prediction means), and control unit 17 (control means).

The block formation unit 11 divides original image data 21 input to the image compression coding apparatus according to this embodiment into blocks each having a predetermined size, and outputs them to the compression coding unit 14. The total coded data amount upper limit obtained when block-divided original image data completely coded is set in the upper limit setting unit 12. The block count setting unit 13 holds a block count as an image size which is determined in accordance with the size of original image data and the size of each block.

The compression coding unit 14 compression-codes the block-divided original image data by using a plurality of coding parameters 22a to 22n, and concurrently outputs a plurality of coded data 23a to 23n. The data amount accumulation unit 15 counts and accumulates the data amounts of the coded data 23a to 23n to output a cumulative data amount.

The maximum coded data amount prediction unit 16 calculates the maximum total coded data amount predictive value, which is a data amount obtained when the remaining blocks are coded and the coded data amounts of all the blocks are maximum, on the basis of the number of remaining blocks obtained from the total block count set by the block count setting unit 13 and the number of blocks that have already been compression-coded, the maximum coded data amount per block, and the cumulative coded data amount value of a coded data exhibiting the maximum cumulative coded data amount value (cumulative data amount) calculated by the data amount accumulation unit 15.

The control unit 17 compares a plurality of cumulative coded data amount values calculated by the data amount accumulation unit 15 with the total coded data amount upper limit set in the upper limit setting unit 12. If there is any value that exceeds the upper limit, processing is performed to abort the compression coding processing with the corresponding compression coding parameter. In addition, when it is determined that the maximum total coded data predictive value will not exceed the total coded data amount upper limit, compression coding processing with compression coding parameters other than the corresponding one is aborted.

Note that in the image compression coding apparatus according to the present invention, the maximum coded data amount per block and a method of calculating it are not defined.

The maximum coded data amount per block depends on the size of each block, a compression coding scheme, and a compression coding parameter. The maximum coded data amount per block will be described in a case wherein the JPEG coding scheme which is a representative compression coding scheme for still images is used as a compression coding scheme for the image compression coding apparatus according to this embodiment.

In JPEG coding, entropy coding is performed after orthogonal transform coefficients obtained by DCT are quantized. Note that the Huffman coding scheme is used for entropy coding. The maximum coded data amount depends on a quantization table used for quantization, the difference values between DC components in orthogonal transform coefficients, the Huffman codes assigned to the respective combinations of invalid coefficient runlengths and valid coefficients, and an overhead bit length. Under the circumstances, a method of obtaining the theoretically maximum coded data amount is conceived.

In addition, according to the JPEG coding scheme, as the correlation degree between adjacent pixels decreases, the compression ratio decreases. Therefore, there may be provided a method of performing coding processing by using such images as samples and actually and statistically obtaining the maximum one of the resultant coded data amounts as a maximum coded data amount.

Figure 2:
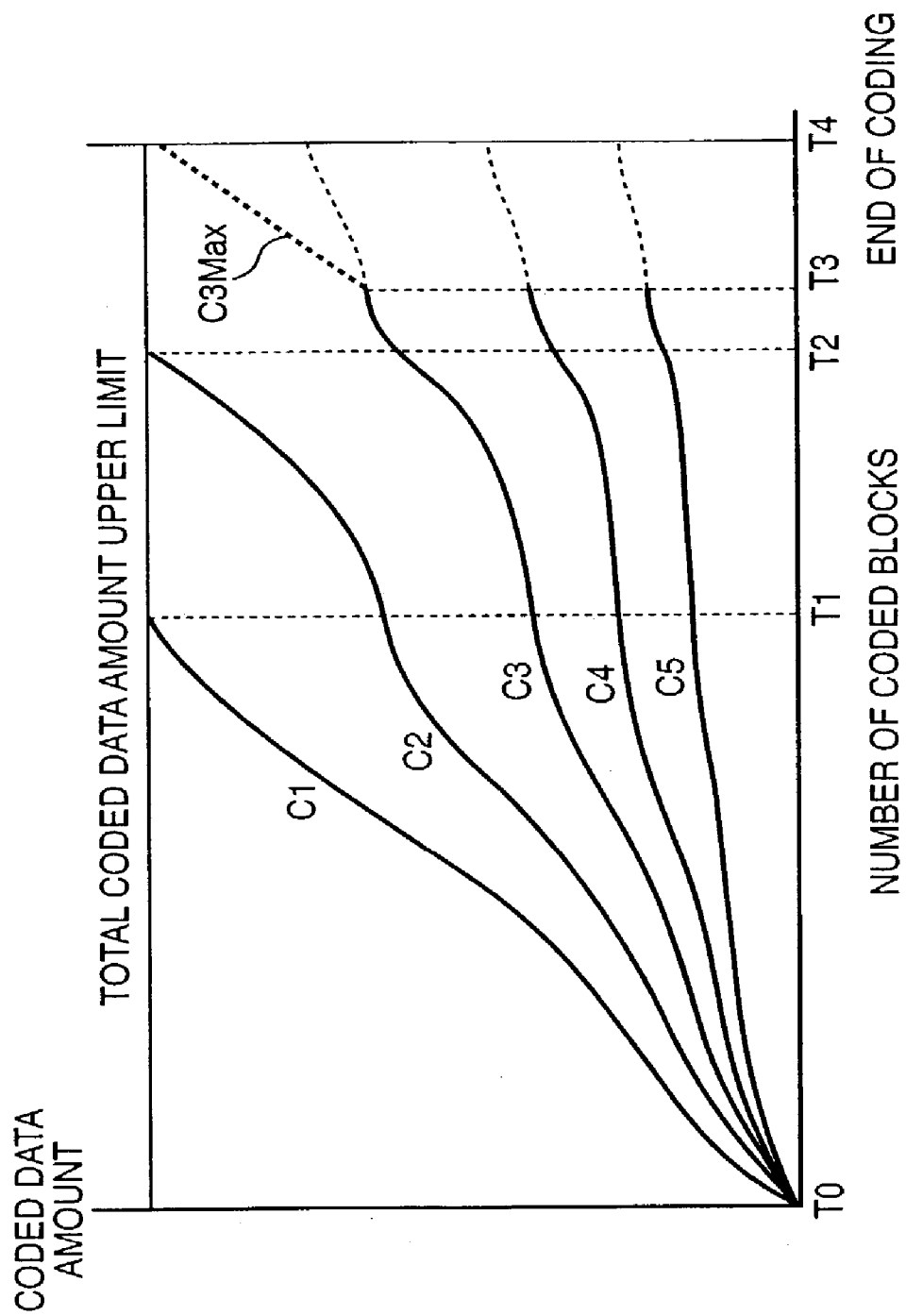
FIG. 2 is a graph for explaining the relationship between the total coded data amount upper limit set in an upper limit setting unit 12 in the image compression coding apparatus according to the second embodiment, the cumulative coded data amount (ordinate) generated by a compression coding unit 14 and calculated by a data amount accumulation unit 15, and the relative position (abscissa) of a block of original image data which has already been compression-coded.
Figure 3:
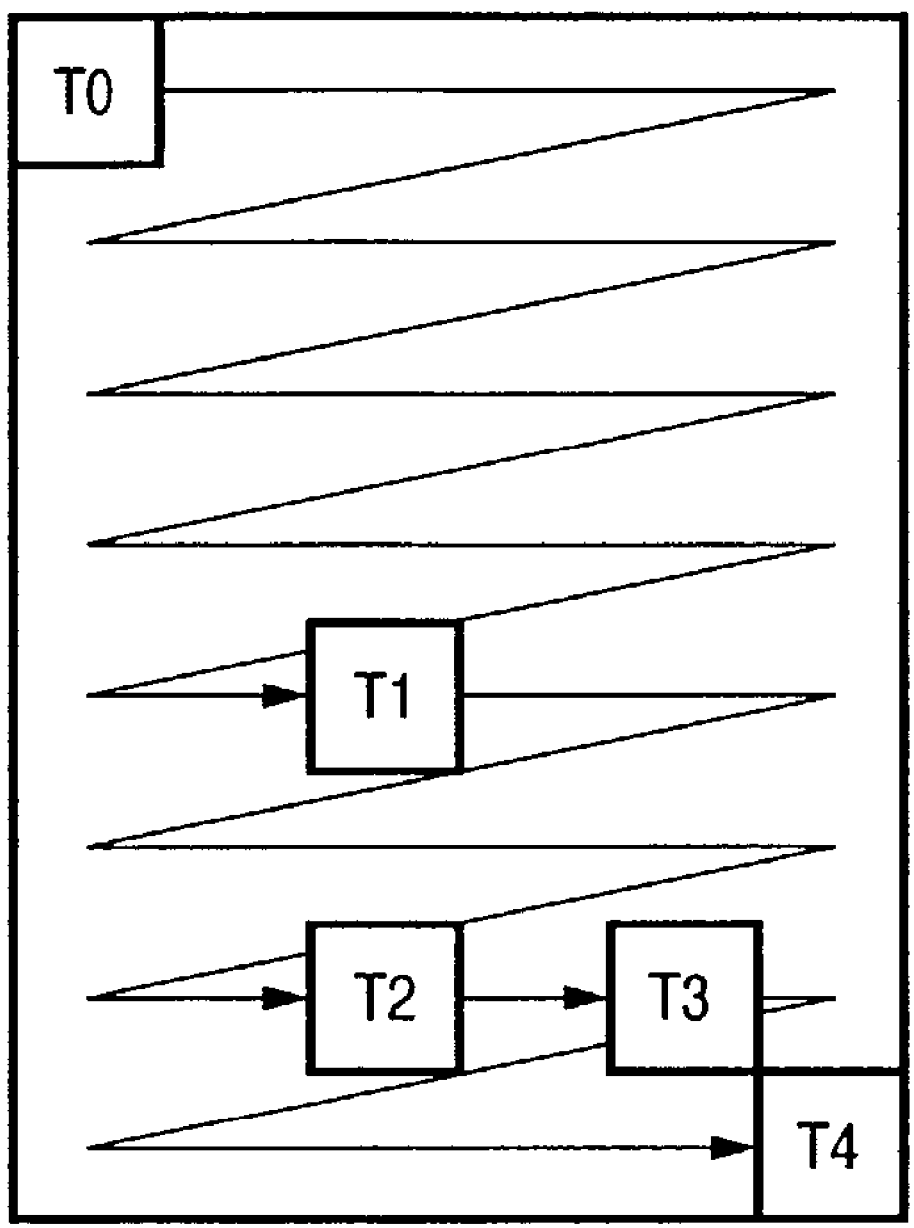
FIG. 3 is a schematic view for explaining the relative positions of blocks T0, T1, T2, T3, and T4 shown in FIG. 2 in the original image data.

FIG. 2 is a graph for explaining the relationship between the total coded data amount upper limit set in the upper limit setting unit 12 in the image compression coding apparatus according to the second embodiment, the cumulative coded data amount (ordinate) calculated by the data amount accumulation unit 15, and the relative position (abscissa) of a block of original image data which has already been compression-coded. FIG. 3 is a schematic view for explaining the relative positions of blocks T0, T1, T2, T3, and T4 shown in FIG. 2 in the original image data.

Figure 4:
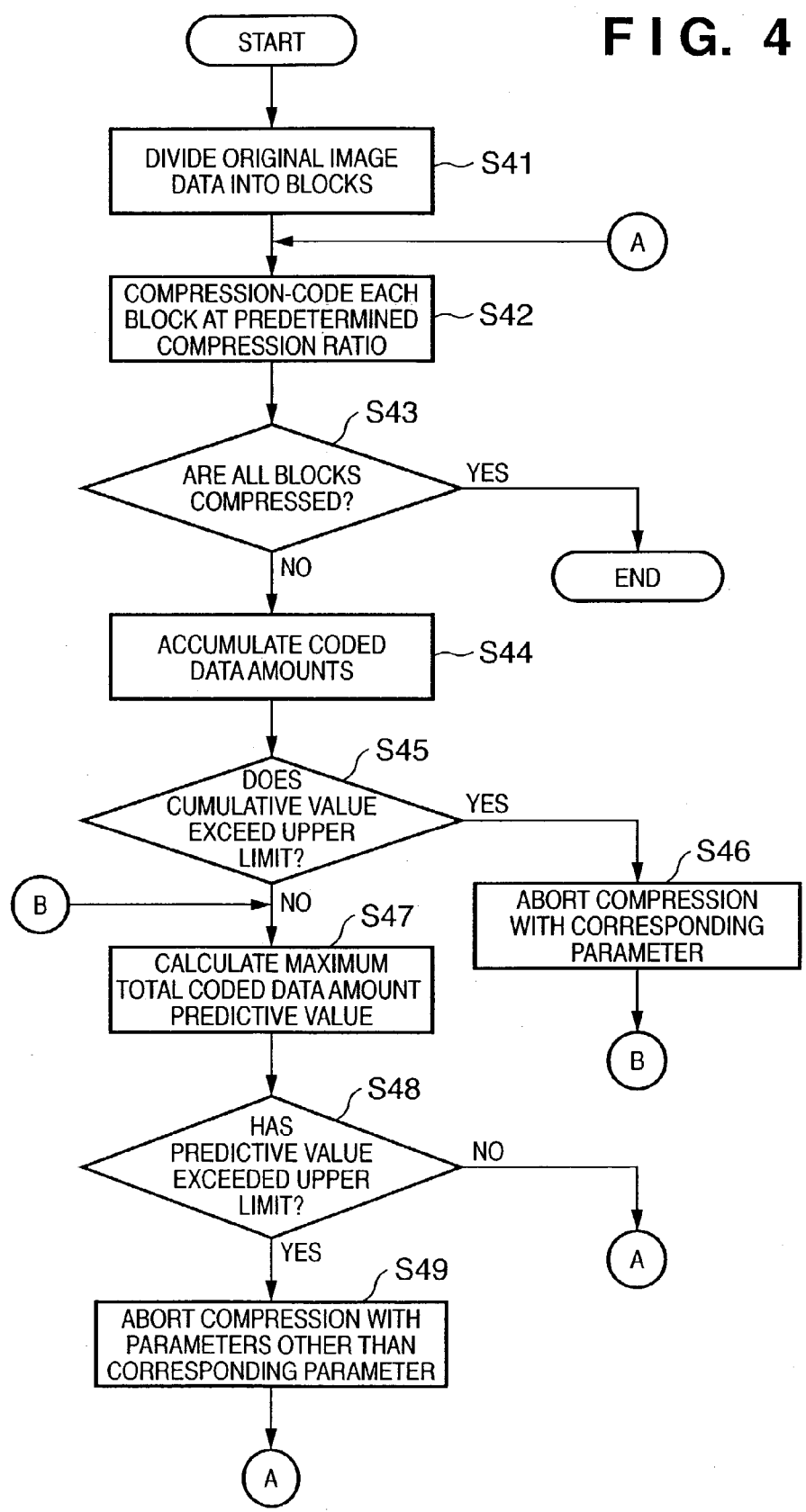
FIG. 4 is a flow chart for explaining an operation procedure for the image compression coding apparatus according to the second embodiment.

An operation procedure for the image compression coding apparatus according to this embodiment will be described below with reference to the accompanying drawings. FIG. 4 is a flow chart for explaining the operation procedure for the image compression coding apparatus according to the second embodiment. As described above, the block formation unit 11 divides original image data 21 input to this apparatus into blocks each having a predetermined size (step S41). The compression coding unit 14 compression-codes the divided blocks using a plurality of coding parameters (step S42). Assume that in this embodiment, compression coding is performed by using five parameters.

The image compression coding apparatus according to this embodiment starts compression coding processing from the block T0 in FIG. 3, and outputs five coded data C1 to C5 with different compression ratios in FIG. 2 with respect to the respective blocks. The data amount accumulation unit 15 then counts and accumulates the data amounts of five coded data output from the compression coding unit 14 (step S44). The control unit 17 compares the cumulative coded data amount value calculated by the data amount accumulation unit 15 with the upper limit set in the upper limit setting unit 12 (step S45).

If the cumulative coded data amount value exceeds the upper limit (YES), compression processing with the corresponding coding parameter is aborted (step S46). The subsequent blocks are compressed using coding parameters other than this coding parameter. As shown in the graph of FIG. 2, since the cumulative coded data amount value of the coded data C1 exceeds the total coded data amount upper limit when the image compression coding apparatus completes compression coding processing up to the block T1, the coding processing for the coded data C1 is aborted. That is, the four coded data C2 to C5 are output with respect to the subsequent blocks. In addition, since the cumulative coded data amount value of the coded data C2 also exceeds the total coded data amount upper limit when the compression coding processing is completed up to the block T2, the coding processing for the coded data C2 is aborted. That is, the three coded data C3 to C5 are output with respect to the subsequent blocks.

If the cumulative value does not exceed the upper limit (NO), the maximum total coded data amount prediction unit 16 calculates the maximum total coded data amount predictive value (step S47). The control unit 17 then compares this maximum total coded data amount predictive value with the upper limit set in the upper limit setting unit 12 (step S48).

If the maximum total coded data amount predictive value doesn't exceed the upper limit (YES), the compression processing with the other coding parameter is aborted (step S49).

When, for example, compression coding processing is completed up to the block T3, it is determined that a maximum total coded data amount predictive value C3Max does not exceed the total coded data amount upper limit, the control unit 17 aborts the compression coding processing for the coded data C4 and C5 higher in compression ratio than C3. That is, in the subsequent processing, only the coded data C3 is output. When the compression coding processing is completed up to the block T4, the compression coding processing for all the blocks constituting the original image is completed. As a result, the coded data C3 is generated by the image compression coding apparatus according to this embodiment.

As described above, in compression-coding block-divided original image data, even with respect to an image whose data amount becomes maximum when all blocks which have not been compression-coded are coded, upon determining that the maximum total coded data amount predictive value does not exceed the total coded data amount upper limit, the image compression coding apparatus according to the this embodiment aborts compression coding processing with compression coding parameters other than the coding parameter used for the corresponding coded data. This coded data is then selected as compression-coded data to be output from the image compression coding apparatus according to this embodiment.

FIG. 5 is a schematic view for explaining how the image compression coding apparatus according to the second embodiment is connected to a memory for storing coded data in an external system. As shown in FIG. 5, the coded data 23a to 23n output from an image compression coding apparatus 10 are transferred to a memory 51 via a bus controlled by a bus control unit 52.

As shown in FIG. 5, in the system including the image compression coding apparatus according to this embodiment, a coded data whose cumulative data amount does not exceed the total coded data amount upper limit and is nearest thereto is stored as the compression-coded data of the original image in the memory 51, and coded data other than the stored data are discarded. In the system shown in FIG. 5, as the number of coded data increases, the overhead in transfer to the memory increases. The image compression coding apparatus 10 must temporarily interrupt compression coding during a wait for memory transfer. As a consequence, the time required for image compression coding increases.

In this case, as described above, if it is determined that the maximum total coded data amount predictive value does not exceed the total coded data amount upper limit, compression coding processing with compression coding parameters other than the corresponding compression coding parameter is aborted. As a consequence, the apparatus outputs no coded data which is to be discarded from the memory 51. This makes it possible to suppress a decrease in overhead accompanying data transfer outside the image compression coding apparatus.

That is, the present invention is characterized by further including a storage means (memory 51) for storing a plurality of compression-coded data and a discarding means (control unit 17) for discarding coded data obtained by compression coding at the compression ratio set in compression coding processing for image data which is aborted by the control means (control unit 17).

As described above, in the image compression coding apparatus according to this embodiment, in coding the remaining blocks constituting an original image, if the maximum total coded data amount predictive value set when all the blocks exhibit the maximum coded data amounts does not exceed the total coded data amount upper limit, compression coding processing with compression coding parameters other than the corresponding coding parameter is aborted.

When, therefore, it becomes apparent that the total coded data amount set when a block-divided original image is completely compression-coded will not exceed the upper limit, since no coded data other than the corresponding coded data are output, the overhead accompanying the transfer of the coded data is reduced, thereby shortening the processing time for compression coding processing while realizing information amount control.

In the image compression coding apparatus according to this embodiment, even if the data amount of coded blocks exceeds the data amount of the blocks of an original image, the compression coding unit 14 outputs the coded data of the blocks without any change. In other embodiments, however, the original image can be output without any change. In this case, the maximum coded data amount of the blocks is equal to the data amount of the block-divided original image. The image compression coding apparatus according to this embodiment can perform processing of performing compression coding while suppressing the total coded data amount within a predetermined value more efficiently.

<Third Embodiment>

Figure 6:
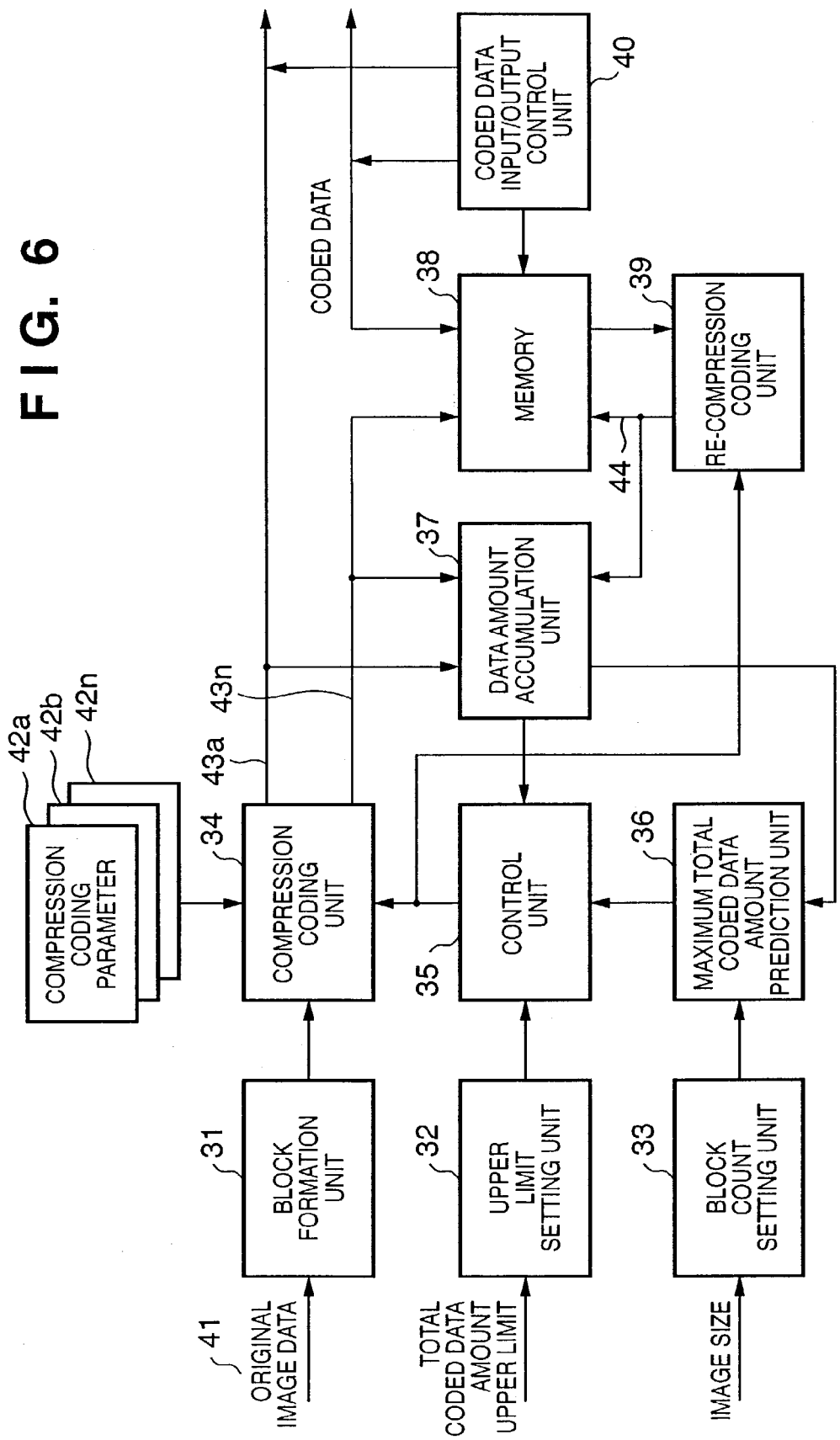
FIG. 6 is a block diagram showing the arrangement of an image compression coding apparatus according to the third embodiment of the present invention.

An image compression coding apparatus according to the third embodiment of the present invention will be described next. FIG. 6 is a block diagram showing the arrangement of the image compression coding apparatus according to the third embodiment of the present invention. As shown in FIG. 6, the image compression coding apparatus according to this embodiment is comprised of a block formation unit 31 (block formation means), upper limit setting unit 32 (upper limit setting means), block count setting unit 33 (block count setting means), compression coding unit 34 (compression coding unit means), control unit 35 (control means), maximum total coded data amount prediction unit 36 (maximum total coded data amount prediction means), data amount accumulation unit 37 (data amount accumulation means), memory 38 (storage means), re-compression coding unit 39 (re-compression coding means), and coded data input/output control unit 40 (output control means).

The image compression coding apparatus according to this embodiment will be described in detail below with reference to FIG. 6. The block formation unit 31 divides an original image data 41 input to the image compression coding apparatus into blocks each having a predetermined size, and outputs them to the compression coding unit 34. The total coded data amount upper limit obtained when block-divided original image data completely coded is set in the upper limit setting unit 32. The block count setting unit 33 holds a block count as an image size which is determined in accordance with the size of original image data and the size of each block.

The compression coding unit 34 compression-codes the original image, which is divided into blocks each having the predetermined size by the block formation unit 31, by using compression coding parameters, of compression coding parameters 42a to 42n, which are designated by the control unit 35, and outputs coded data 43a and 43b. Note that the coded data 43b is higher in compression ratio than the coded data 43a. The coded data 43a is output outside the image compression coding apparatus. The coded data 43b is output to the memory 38.

The re-compression coding unit 39 re-compression-codes the coded data temporarily stored in the memory 38 and outputs a coded data 44. The data amount accumulation unit 37 counts and accumulates the data amounts of the coded data 43a, 43b, and 44. In this case, the cumulative coded data amount values of the coded data 43b and 44 are added, and the resultant value is output to the maximum total coded data amount prediction unit 36.

The maximum total coded data amount prediction unit 36 calculates the maximum total coded data amount predictive value, which is a data amount obtained when the remaining blocks constituting the original image are coded and the coded data amounts of all the blocks are maximum, on the basis of the number of remaining blocks obtained from the total block count set by the block count setting unit 33 and the number of blocks that have already been compression-coded, the maximum coded data amount per block, and the sum of the cumulative data amount values of the coded data 43b and 44 which is obtained from the data amount accumulation unit 37.

In addition, the control unit 35 performs the following processing if it is determined upon comparison that the cumulative coded data amount value (cumulative data amount) of the coded data 43a calculated by the data amount accumulation unit 37 exceeds the total coded data amount upper limit set in the upper limit setting unit 32.

If the maximum total coded data amount predictive value exceeds the total coded data amount upper limit, the control unit 35 changes the compression coding parameters to be used to generate the coded data 43a and 43b and instructs the re-compression coding unit 39 to re-compression-code the coded data temporarily stored in the memory 38. The control unit 35 then instructs the coded data input/output control unit 40 to perform control to output the coded data temporarily stored in the memory 38 outside the image compression coding apparatus according to this embodiment and control to input/output coded data to/from the re-compression coding unit 39.

If the maximum total coded data amount predictive value does not exceed the total coded data amount upper limit, the control unit 35 changes the compression coding parameter to be used to generate the coded data 43a and aborts the generation of the coded data 43b. The control unit 35 then instructs the coded data input/output control unit 40 to output the coded data temporarily stored in the memory 38 outside the image compression coding apparatus according to this embodiment. In this case, the re-compression coding unit 39 performs no re-compression coding processing.

Figure 7:
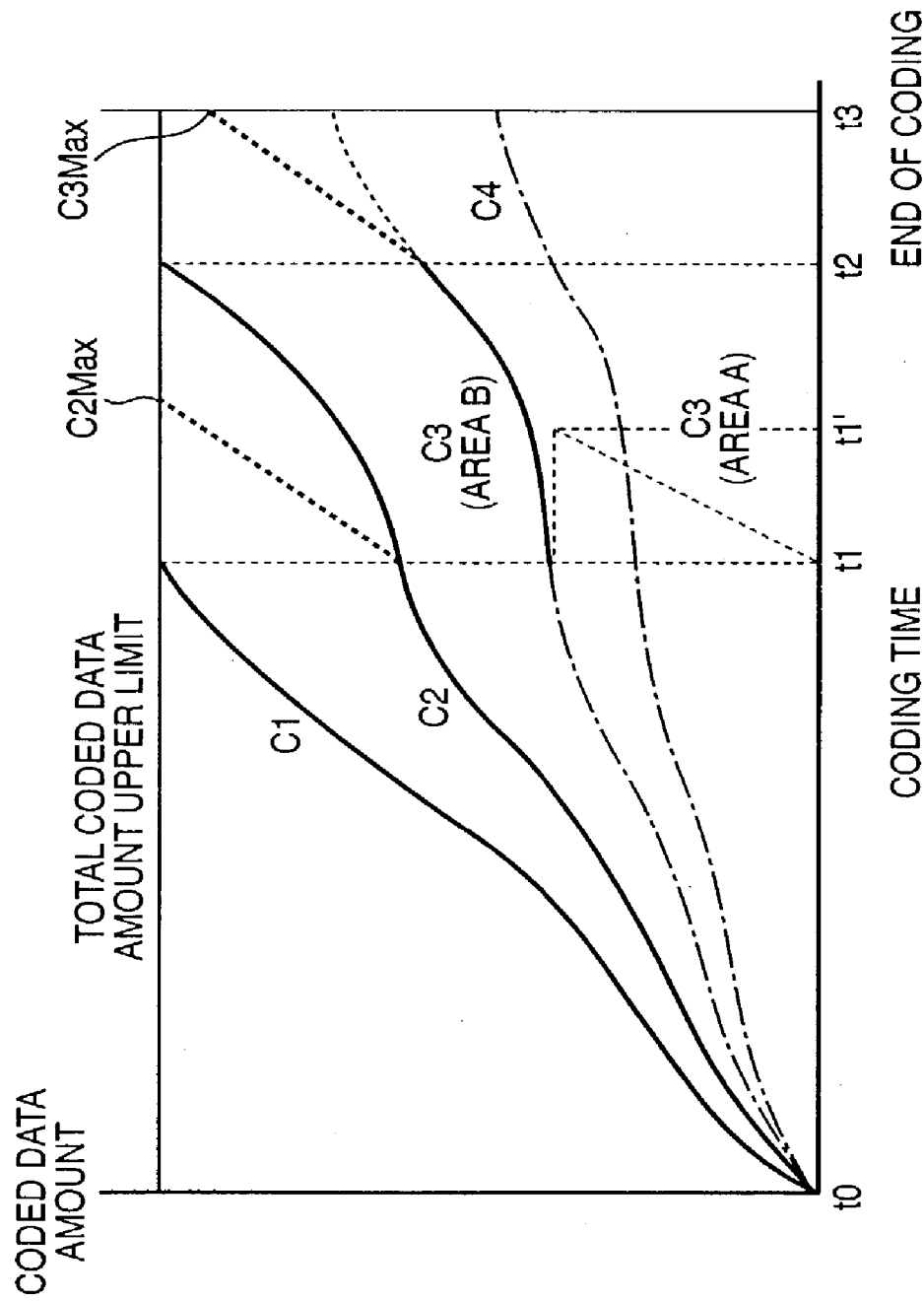
FIG. 7 is a graph for explaining the relationship between the cumulative coded data amount value (ordinate) of the coded data generated by the image compression coding apparatus according to the third embodiment and the time (abscissa) required for compression coding processing for an original image.
Figure 8:
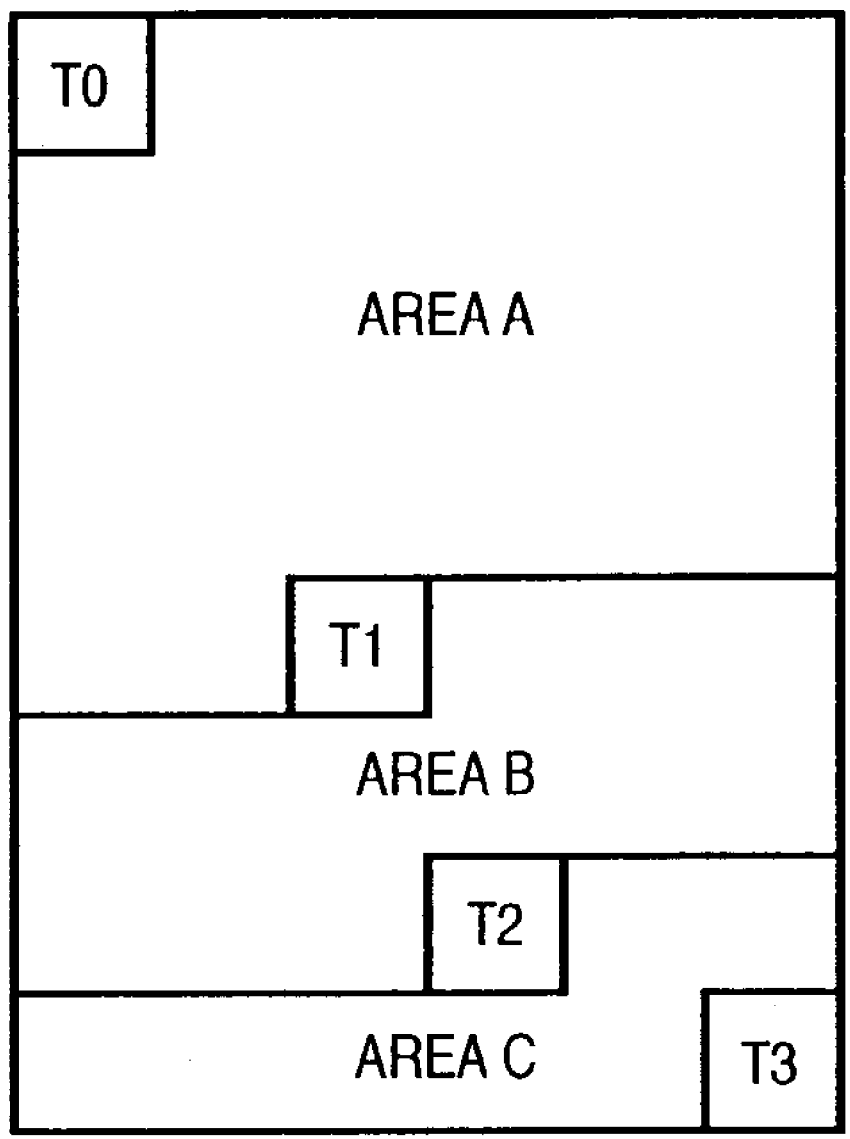
FIG. 8 is a view showing relative positions T0, T1, T2, and T3 of blocks, on the original image, which have been compression-coded at times t0, t1, t2, and t3 on the graph in FIG. 7, and three divided areas A, B, and C on two-dimensionally expressed original image data.

The time required for the image compression coding apparatus of this embodiment to perform compression coding processing for an original image will be described below. FIG. 7 is a graph for explaining the relationship between the cumulative coded data amount value (ordinate) of the coded data generated by the image compression coding apparatus according to the third embodiment and the time (abscissa) required for compression coding processing for an original image. FIG. 8 is a view showing relative positions T0, T1, T2, and T3 of blocks, on the original image, which have been compression-coded at times t0, t1, t2, and t3 on the graph in FIG. 7, and three divided areas A, B, and C on two-dimensionally expressed original image data.

A coded data C1 is output outside the image compression coding apparatus according to this embodiment until time t1 on the graph of FIG. 7. A coded data C2 is then temporarily stored in the memory 38 in FIG. 2. When compression coding processing is completed up to the block T1 of the original image data in FIG. 8 (i.e., time t1 in FIG. 6), the cumulative coded data amount value of the coded data C1 exceeds the total coded data amount upper limit.

At this time, a maximum total coded data amount predictive value C2Max of the coded data C2 which is calculated by the maximum total coded data amount prediction unit 36 exceeds the total coded data amount upper limit. Assume therefore that the total coded data amount obtained when the original image in FIG. 8 is completely coded may exceed the total coded data amount upper limit.

In this case, the control unit 35 of the image compression coding apparatus according to this embodiment aborts the compression coding processing of generating the coded data C1, and performs control to start compression coding processing of generating the coded data C2 and a coded data C3 from a block following the block T1.

The control unit 35 also instructs the re-compression coding unit 39 to re-compression-code the coded data C2 obtained by coding the original image portion in the area A in FIG. 8 which has been stored in the memory 38 so as to generate the coded data C3, and to store it in the memory 38 again. The coded data input/output control unit 40 outputs the coded data C2 obtained by coding the original image portion in the area A in FIG. 8, which has been stored in the memory 38, outside the image compression coding apparatus according to the present invention. After time t1 in FIG. 7, the coded data C2 is output outside the image compression coding apparatus according to the present invention, and the coded data C3 is temporarily stored in the memory 38.

At time t2, at which image data have been coded up to the block T2 in FIG. 8, the cumulative coded data amount value of the coded data C2 in FIG. 7 exceeds the total coded data amount upper limit. The control unit 35 therefore aborts the generation of the coded data C2. At this time, a maximum total coded data amount predictive value C3Max calculated by the maximum total coded data amount prediction unit 36 does not exceed the total coded data amount upper limit. Even if, therefore, all the data in the area C (FIG. 8) for which coding processing has not been completed at time t2 are coded, the total coded data amount of the coded data C3 does not exceed the total coded data amount upper limit.

The control unit 35 therefore issues neither an instruction to start compression coding processing of generating a coded data C4 in FIG. 7 nor an instruction to perform re-compression coding processing for the coded data C3 obtained by coding the data in the areas A and B in FIG. 8. The coded data input/output control unit 40 outputs the coded data C3 in the areas A and B temporarily stored in the memory 38.

When compression coding processing is completed up to the block T3, compression coding processing for all the blocks constituting the original image is completed, and the coded data C3 is generated by the image compression coding apparatus according to this embodiment.

With the above processing, upon determining that the total coded data amount does not exceed the preset upper limit, the image compression coding apparatus according to this embodiment aborts compression coding processing for coded data other than the corresponding coded data. Consequently, since the number of coded data to be output from the compression coding unit 34 decreases, the overhead accompanying transfer of coded data outside the image compression coding apparatus decreases, as described in association with the connection between the external memory and the image compression coding apparatus according to the second embodiment shown in FIG. 4. In addition, since no re-compression coding processing is performed in the above case, no coded data is transferred between the re-compression coding unit 39 and memory 38, and hence the overhead accompanying the outputting of coded data, decreases.

In the description of this embodiment, the JPEG compression coding scheme has been exemplified as a compression coding scheme for image data. However, in the image compression coding apparatus of the present invention, the type of image data and its compression coding scheme are not specifically limited. For example, the image compression coding apparatus according to the present invention can also be applied to a case wherein data representing the attributes of an image, e.g., indicating whether pixels constituting an image are characters, or chromatic or achromatic, is to be runlength-compression-coded.

In addition, in the image compression coding apparatus according to the third embodiment of the present invention, in coding the remaining blocks constituting an original image, if the maximum total coded data amount predictive value set when all the blocks exhibit the maximum coded data amounts does not exceed the total coded data amount upper limit, compression coding processing with compression coding parameters other than the corresponding coding parameter is aborted, and no re-compression coding processing is performed.

If, therefore, it becomes apparent that when the cumulative coded data amount value exceeds the total coded data amount upper limit, the total coded data amount set when a block-divided original image is completely compression-coded will not exceed the upper limit, compression coding processing with compression coding parameters other than the corresponding compression coding parameter and re-compression coding processing for the coded data stored in the memory are aborted, the overhead accompanying the transfer of coded data decreases. This makes it possible to shorten the processing time for compression coding processing while realizing information amount control.

<Fourth Embodiment>

Figure 9:
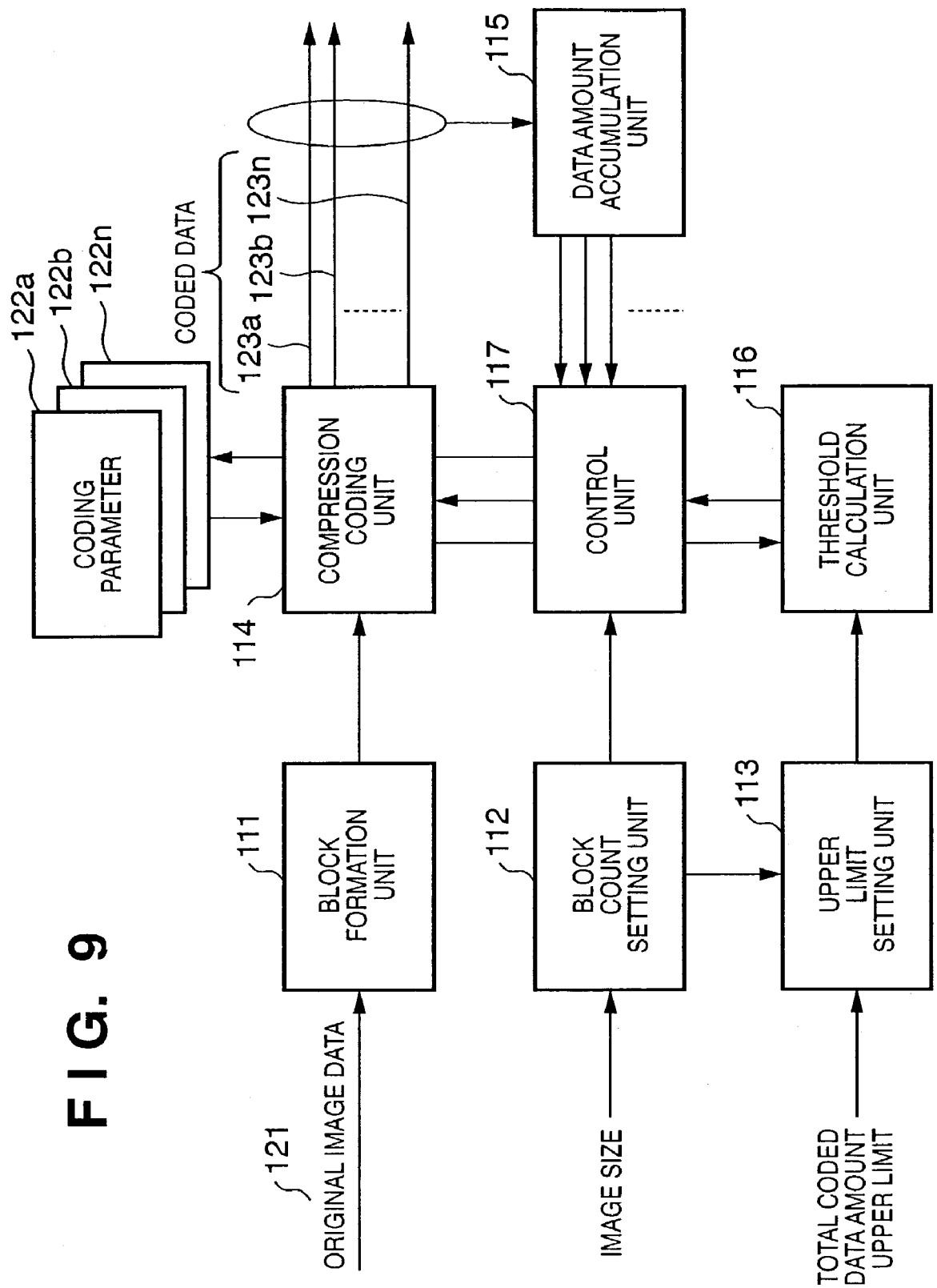
FIG. 9 is a block diagram showing the arrangement of an image compression coding apparatus according to the fourth embodiment of the present invention.

An image compression coding apparatus according to the fourth embodiment of the present invention will be described in detail next with reference to the accompanying drawings. FIG. 9 is a block diagram showing the arrangement of the image compression coding apparatus according to the fourth embodiment of the present invention. The image compression coding apparatus according to this embodiment is comprised of a block formation unit 111 (block formation means), block count setting unit 112 (block count setting means), upper limit setting unit 113 (upper limit setting means), compression coding unit 114 (compression coding means), data amount accumulation unit 115 (data amount accumulation means), threshold calculation unit 116 (threshold calculation means), and control unit 117 (control means).

The block formation unit 111 divides original image data 121 input to the image compression coding apparatus of this embodiment into blocks each having a predetermined size, and outputs them to the compression coding unit 114. The block count setting unit 112 holds a block count, as an image size, which is determined in accordance with the size of original image data and the size of each block. The total coded data amount upper limit obtained when block-divided original image data completely coded is set in the upper limit setting unit 113.

The compression coding unit 114 compression-codes the block-divided original image data by using a plurality of coding parameters $122a$ to $122n$, and outputs a plurality of coded data $123a$ to $123n$. The data amount accumulation unit 115 counts and accumulates the data amounts of the coded data $123a$ to $123n$ to calculate a cumulative data amount.

The threshold calculation unit 116 calculates a coded data amount threshold on the basis of the block count set in the block count setting unit 112, the relative position of a block of the original image data which has been coded by the compression coding unit 114, the upper limit set in the upper limit setting unit 113, and the theoretical minimum code amount based on the compression coding scheme. In the image compression coding apparatus according to this embodiment, the minimum code amount per block is set as the theoretical minimum code amount based on the compression coding scheme.

The theoretical minimum code amount will be described below by exemplifying the JPEG coding scheme widely used for compression coding of still images. When, for example, an image constituted by only white pixels is JPEG-coded, the difference value between the DC components of adjacent blocks of the DC components obtained by frequency-transforming the image by a DCT is 0. In this case, a Huffman code is 2-bit data "00". In addition, all AC components are 0 and expressed by EOBs. An EOB Huffman code is 4-bit data "1010". Therefore, the minimum code amount per block is six bits.

The minimum code amount also depends on the number of small blocks which constitute a block-divided original image and each of which serves as a unit of DCT in JPEG, the number of components, and the number of samples. This amount further depends on the number of marker codes such as EOI markers, restart markers, and headers as well as a JPEG ECS coding unit. When data that has been divided into blocks and compression-coded is to be formed into packets and a header is to be added to each packet, the size of each packet is also associated with the minimum code amount. Therefore, the minimum code amount per block becomes larger than six bits and depends on the specifications of a system including the image compression coding apparatus.

A method of calculating a threshold in the image compression coding apparatus according to this embodiment will be described below. Letting L be the theoretical minimum code amount per block, H be the total coded data amount upper limit, and R be the number of remaining non-compressed tiles obtained from the total number of blocks and the relative position information of a block of the original image, a threshold T is given by $$T=H-L \times R \quad (2)$$

In the image compression coding apparatus according to this embodiment, a threshold is calculated every time compression coding processing is done for one block. In consideration of the computation amount, however, the above threshold may be calculated when a plurality of tiles are compression-coded. Alternatively, an initial threshold may be obtained before coding processing for image data, and a threshold may be calculated by adding the minimum code amount of one block to the threshold every time compression coding processing is done for one block.

In this method, letting B be the total number of blocks, an initial threshold T' is given by $$T'=H-L \times B \quad (3)$$

The threshold T is obtained by cumulatively adding the minimum code amount L to the initial threshold T' every time compression coding processing is done for one block.

The control unit 117 compares the threshold calculated by the threshold calculation unit 116 with a plurality of cumulative coded data amount values counted and calculated by the data amount accumulation unit 115. If there is any cumulative coded data amount value that exceeds the threshold, the compression coding unit 114 is controlled to abort compression coding processing with the coding parameter used to generate the corresponding coded data. This is because it is obvious that when a cumulative coded data amount value exceeds the threshold, the cumulative coded data amount value obtained by coding subsequent original image tiles will exceed the total coded data amount upper limit.

Figure 10:
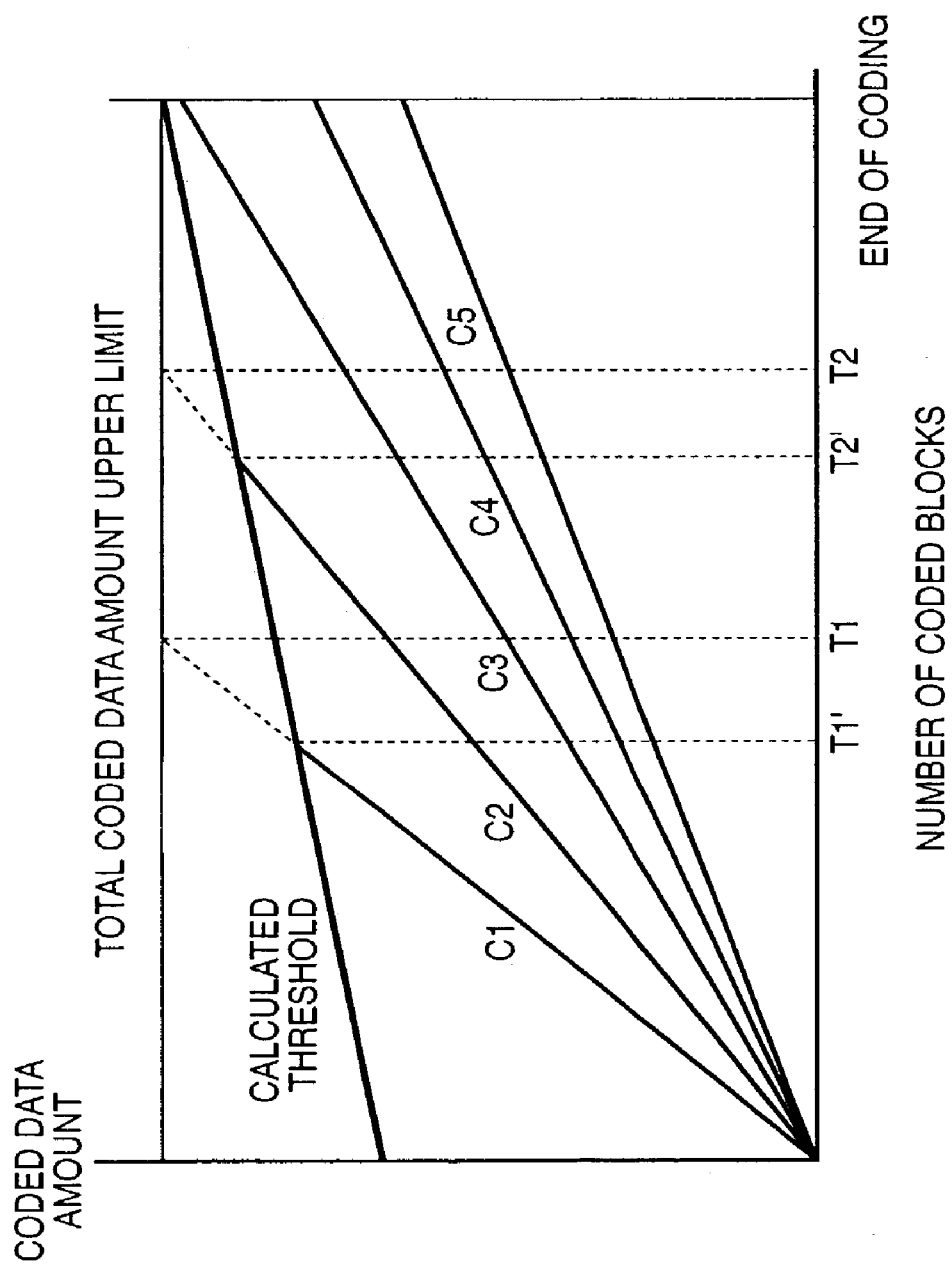
FIG. 10 is a graph for explaining the relationship between the total coded data amount upper limit set in an upper limit setting unit 113 in FIG. 9, the threshold calculated by a threshold calculation unit 116, the cumulative coded data amount (ordinate) generated by a compression coding unit 114 and calculated by a data amount accumulation unit 115, and the relative position (abscissa) of a block of original image data which has already been compression-coded.

FIG. 10 is a graph for explaining the relationship between the total coded data amount upper limit set in the upper limit setting unit 113 in FIG. 9, the threshold calculated by the threshold calculation unit 116, the cumulative coded data amount (ordinate) calculated by the data amount accumulation unit 115, and the relative position (abscissa) of a block of original image data which has already been compression-coded.

Referring to FIG. 10, reference symbol T1 denotes the number of blocks that had been coded by the time the cumulative data amount of a coded data C1 reached the total coded data amount upper limit; and T1', the number of blocks that had been coded by the time the coded data of the coded data C1 reached the threshold calculated by the threshold calculation unit 116. The image compression coding apparatus according to this embodiment aborts the compression coding processing for the coded data C1 when the coded data C1 is generated up to a block T1' and the cumulative coded data amount value exceeds the threshold. Likewise, the coding processing is aborted at a block T2' where C2 exceeds the threshold. In this manner, the coding processing for C1 and C2 is aborted earlier than when the cumulative coded data amount value exceeds the total coded data amount upper limit.

Figure 11:
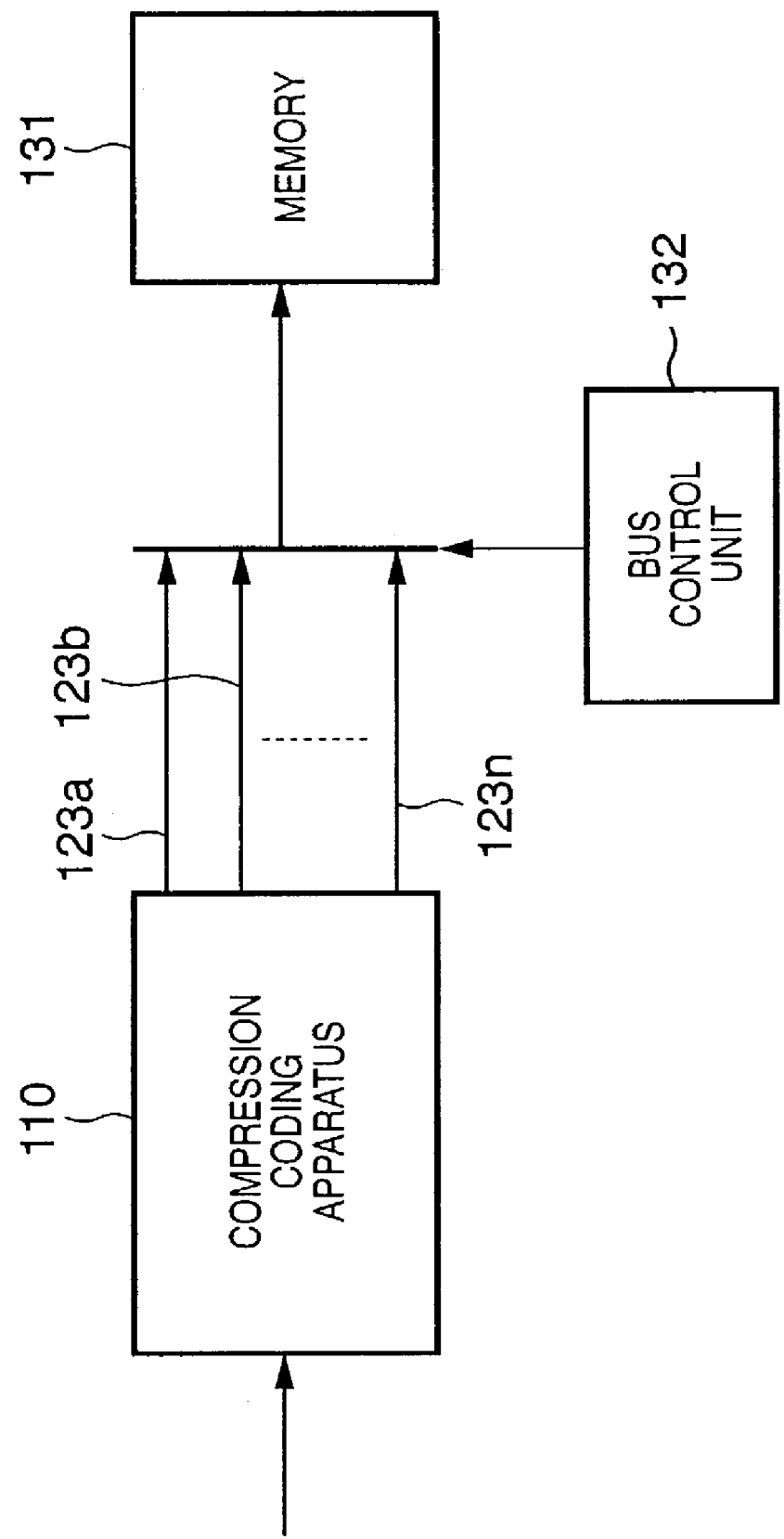
FIG. 11 is a view how the image compression coding apparatus according to the fourth embodiment is connected to a memory for storing coded data in an external system.

FIG. 11 is a view how the image compression coding apparatus according to the fourth embodiment is connected to a memory for storing coded data in an external system. Coded data 123*a* to 123*n* output from a compression coding apparatus 110 are transferred to a memory 131 via a bus controlled by a bus control unit 132. In the system including the image compression coding apparatus according to this embodiment, a coded data whose cumulative data amount value does not exceed the total coded data amount upper limit and is nearest thereto is stored as the compression-coded data of the original image in the memory 131, and coded data other than the stored data are discarded.

In the system shown in FIG. 11, as the number of coded data increases, overhead in transfer to the memory increases. The image compression coding apparatus must temporarily interrupt compression coding during a wait for memory transfer. As a consequence, the time required for image compression coding increases. In this case, as described above, if coding processing is aborted when the cumulative coded data amount value exceeds the threshold calculated on the basis of the minimum code amount per block and the relative position of a block of the original image, any coded data whose cumulative data amount will apparently exceed the total coded data amount upper limit is not transferred to the memory. This makes it possible to suppress a decrease in overhead accompanying data transfer outside the image compression coding apparatus.

As described above, in the image compression coding apparatus according to the fourth embodiment, if any one of the cumulative coded data amount values of a plurality of coded data with different compression ratios exceeds the threshold calculated on the basis of a preset total coded data amount upper limit, the theoretical minimum coded data amount per block which is based on the compression coding scheme, the total block count set in the block count setting means, and the relative position information of a block of the image data which have been compression-coded by the compression coding means, compression coding processing with the corresponding compression coding parameter is aborted.

Since the coding processing is aborted before the cumulative coded data amount value of a coded data which will apparently exceed the total coded data amount upper limit exceeds the total coded data amount upper limit, the overhead in a case wherein coded data with different compression ratios are concurrently output and transferred to an external memory or the like via a transmission path can be reduced. This makes it possible to increase the processing speed of compression coding while realizing information amount control.

In comparison with the first embodiment of the present invention, according to the method in the fourth embodiment, in which after an initial threshold is calculated according to equation (3), the minimum coded amount of a predetermined number blocks is added to the threshold every time the predetermined number of blocks are coded, the computation amount can be reduced.

<Fifth Embodiment>

Figure 12:
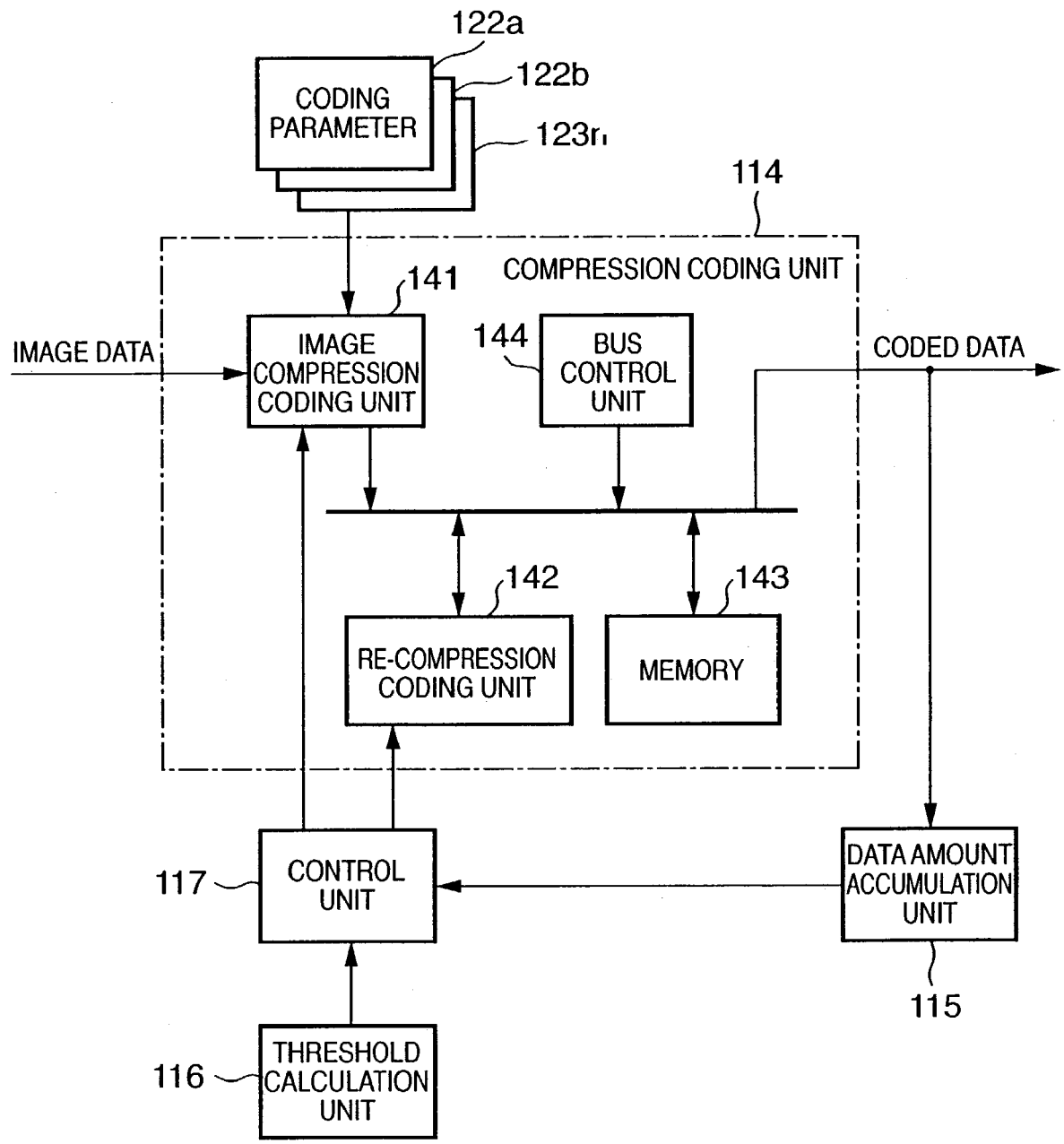
FIG. 12 is a block diagram showing how an image compression coding apparatus according to the fifth embodiment is connected to a memory for storing coded data in an external system.

An image compression coding apparatus according to the fifth embodiment of the present invention will be described next. The image compression coding apparatus according to this embodiment differs from the image compression coding apparatus according to the fourth embodiment shown in FIG. 9 in that a compression coding unit 114 is comprised of an image compression coding unit 141, re-compression coding unit 142, memory 143, and bus control unit 144 in FIG. 12. FIG. 12 is a block diagram showing how the image compression coding apparatus according to the fifth embodiment is connected to a memory for storing coded data in an external system. The image compression coding apparatus according to this embodiment will be described in detail below with reference to FIG. 12.

The image compression coding unit 141 compression-codes block-divided original image data by using the coding parameter designated by a control unit 117. The bus control unit 144 outputs a coded data outside the compression coding unit 114, and at the same time writes it in the memory 143. A data amount accumulation unit 115 counts and accumulates the coded data amounts of coded data output from a compression coding unit 114 to calculate a cumulative data amount.

A threshold calculation unit 116 calculates a cumulative data amount threshold on the basis of the block count set in a block count setting unit 112, the relative position of a block of the original image data which has been coded by the compression coding unit 114, the upper limit set in an upper limit setting unit 113, and the minimum code amount per block.

The control unit 117 compares the cumulative coded data amount value with the threshold calculated by the threshold calculation unit 116. If the cumulative coded data amount value exceeds the threshold, the control unit 117 instructs the image compression coding unit 141 to stop the compression coding processing and instructs the re-compression coding unit 142 to re-compression-code the coded data stored in the memory 143. The bus control unit 144 inputs the coded data stored in the memory 143 to the re-compression coding unit 142 and outputs the re-compression-coded data outside the compression coding unit 114. At the same time, the bus control unit 144 starts a write operation to the memory 143.

After the execution of re-coding processing for all the blocks that had been coded by the time the cumulative coded data amount value exceeded the threshold, the control unit 117 instructs the re-compression coding unit 142 to stop the re-compression coding processing and instructs the image compression coding unit 141 to resume compression coding processing upon changing the coding parameter. Note that in the image compression coding apparatus according to this embodiment, a plurality of coded data with different compression ratios are not concurrently output.

Figure 13:
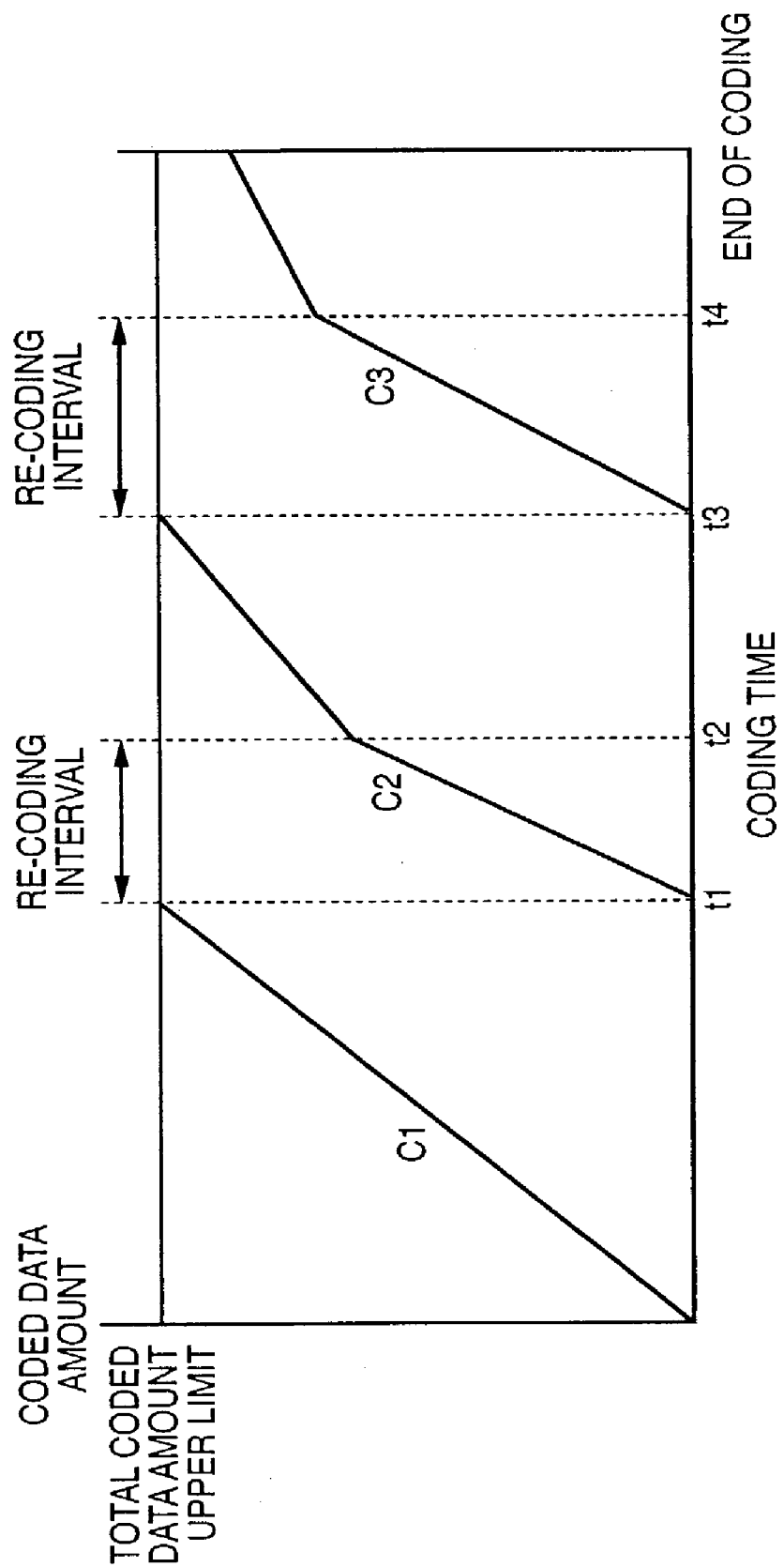
FIG. 13 is a graph showing the relationship between the cumulative coded data amount value (ordinate) calculated by a data amount accumulation unit 115 of the image compression coding apparatus according to the fifth or ninth embodiment and the time (abscissa) required for compression coding processing for an original image.
Figure 14:
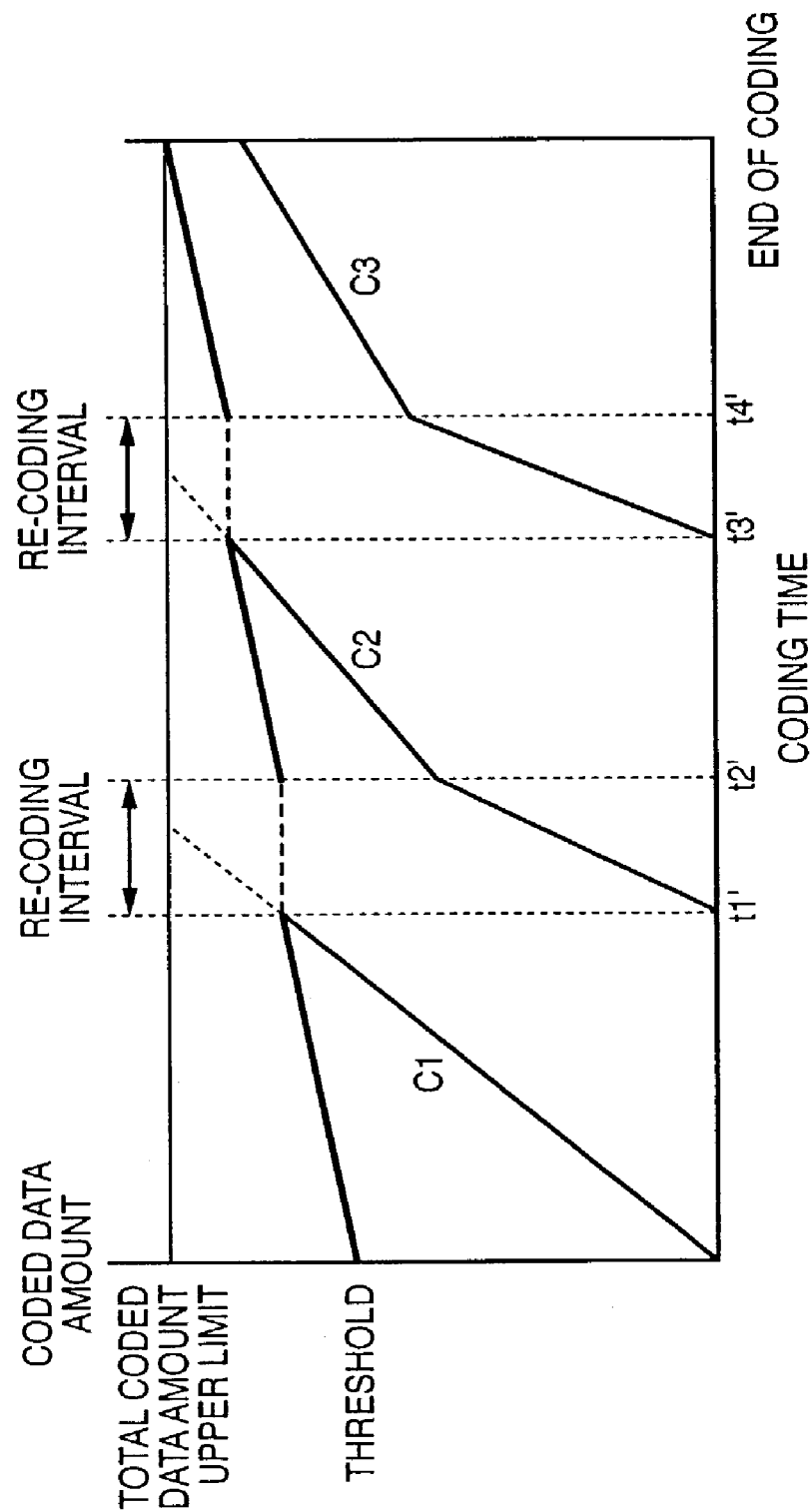
FIG. 14 is a graph showing the relationship between the cumulative coded data amount value (ordinate) calculated by the data amount accumulation unit 115 of the image compression coding apparatus according to the fifth or ninth embodiment and the time (abscissa) required for compression coding processing for an original image.

FIGS. 13 and 14 are graphs each showing the relationship between the cumulative value (ordinate) of the amounts of coded data generated by the compression coding unit 114 and accumulated by the data amount accumulation unit 115 of the image compression coding apparatus according to the fifth embodiment and the time (abscissa) required for compression coding processing for an original image. The graph of FIG. 13 shows the times required for coding processing and re-coding processing in a case wherein re-coding processing is started when the cumulative coded data amount value reaches the total coded data amount upper limit. The graph of FIG. 14 shows the times required for coding processing and re-coding processing in a case wherein re-coding processing is started when the cumulative coded data amount value exceeds the threshold.

As is obvious from a comparison between the graphs of FIGS. 13 and 14, when re-coding processing is started at the time point the cumulative coded data amount value exceeds the threshold, the re-coding processing time becomes shorter than when re-coding processing is started at the total coded data amount upper limit. Therefore, the time required for compression coding processing for the entire original image data is shortened.

As described above, in the image compression coding apparatus according to the fifth embodiment, when the cumulative coded data amount value of a coded data exceeds the threshold calculated on the basis of a preset total coded data amount upper limit, the theoretical minimum coded data amount per block which is based on the compression coding scheme, the total block count set in the block count setting means, and the relative position information of a block of the image data which has compression-coded by the compression coding means, the re-compression coding means is instructed to start re-compression coding. Since re-compression coding processing is started at the instant it becomes apparent that the data amount of a coded data compressed by a given compression coding parameter will exceed the total coded data amount upper limit, the overhead due to re-cording processing can be reduced. This makes it possible to increase the processing speed in performing compression coding processing while realizing information amount control by re-compression coding processing.

<Sixth Embodiment>

An image compression coding apparatus according to the sixth embodiment of the present invention will be described next. The image compression coding apparatus according to this embodiment is assumed to be mounted on a product having an optical reader such as a copying machine. The image compression coding apparatus according to this embodiment has the same arrangement as that of the image compression coding apparatus according to the fourth embodiment shown in FIG. 9 except that a threshold calculation unit 116 sequentially calculates a threshold on the basis of the actually/statistically measured minimum code amount of an image. In this case, an actually/statistically measured minimum code amount indicates a value set by the image compression coding apparatus according to this embodiment in consideration of optical blur in an original image scanned by an optical reader such as a copying machine.

For example, even if an undercoat image constituted by only white pixels is scanned, the resultant data may contain optical blur and noise. In practice, therefore, blocks are not input to the image compression coding apparatus without any processing. For this reason, even if the blocks constituting an original image are compression-coded, the resultant coded data amount is expected to exceed the theoretical minimum code amount based on the compression coding scheme. For this reason, minimum code amounts are actually measured to take the statistics thereof when undercoat original image data constituted by only white pixels is read by an optical reader, and an actually and statistically measured minimum code amount is used to allow the threshold calculation unit 116 of the image compression coding apparatus to calculate a threshold.

FIG. 9 shows the arrangement of the image compression coding apparatus according to this embodiment. The image compression coding apparatus according to the embodiment is comprised of a block formation unit 111 (block formation unit means), upper limit setting unit 113 (upper limit setting means), block count setting unit 112 (block count setting means), compression coding unit 114 (compression coding means), data amount accumulation unit 115 (data amount accumulation means), threshold calculation unit 116 (threshold calculation means), and control unit 117 (control means).

The operations of the block formation unit 111 (block formation unit means), upper limit setting unit 113 (upper limit setting means), block count setting unit 112 (block count setting means), compression coding unit 114 (compression coding means), and data amount accumulation unit 115 (data amount accumulation means) of the image compression coding apparatus according to this embodiment respectively correspond to those in the fourth embodiment of the present invention. The threshold calculation unit 116 calculates a cumulative data amount threshold on the basis of the block count set in the block count setting unit 112, the relative position of block of the original image data which has been coded by the compression coding unit 114, the upper limit value set in the upper limit setting unit 113, and the minimum code amount per block.

In this case, the threshold calculation unit 116 calculates the above minimum code amount by referring to the type of original, image correction information, a read noise coefficient, image feature information, coding parameters 122a to 122n. Minimum code amount correction will be described below.

An original type is a parameter representing the type of original to be read by the scanner of a copying machine. The correlation degree between adjacent pixels of an image read by the scanner varies depending on the quality of the original, and hence the coded data amount varies. Image correction information is a parameter for image correction processing performed for the original image data input to the block formation unit 111. When edge emphasis processing is performed, since the correlation degree between adjacent pixels increases, the code amount increases. When smoothing processing is performed, since the correlation degree between adjacent pixels decreases, the code amount decreases. A read noise coefficient is a parameter based on optical blur and noise in the original image scanned by the optical reader. With an increase in noise, the correlation degree between adjacent pixels increases, and hence the code amount increases. Image feature information is obtained by extracting a feature from the image read by the scanner. For example, information indicating that an input image contains many characters or is a meshed image is extracted before the image is input to the image compression coding apparatus. As the number of characters or meshes increases, the code amount increases, and vice versa. The threshold calculation unit 116 calculates the minimum code amount based on these pieces of information. The threshold calculation unit 116 also corrects the minimum coded data amount corresponding to a coding parameter with a low compression ratio into an amount larger than the theoretical minimum coded data amount and calculates a threshold based on the corrected minimum coded data amount.

Figure 15:
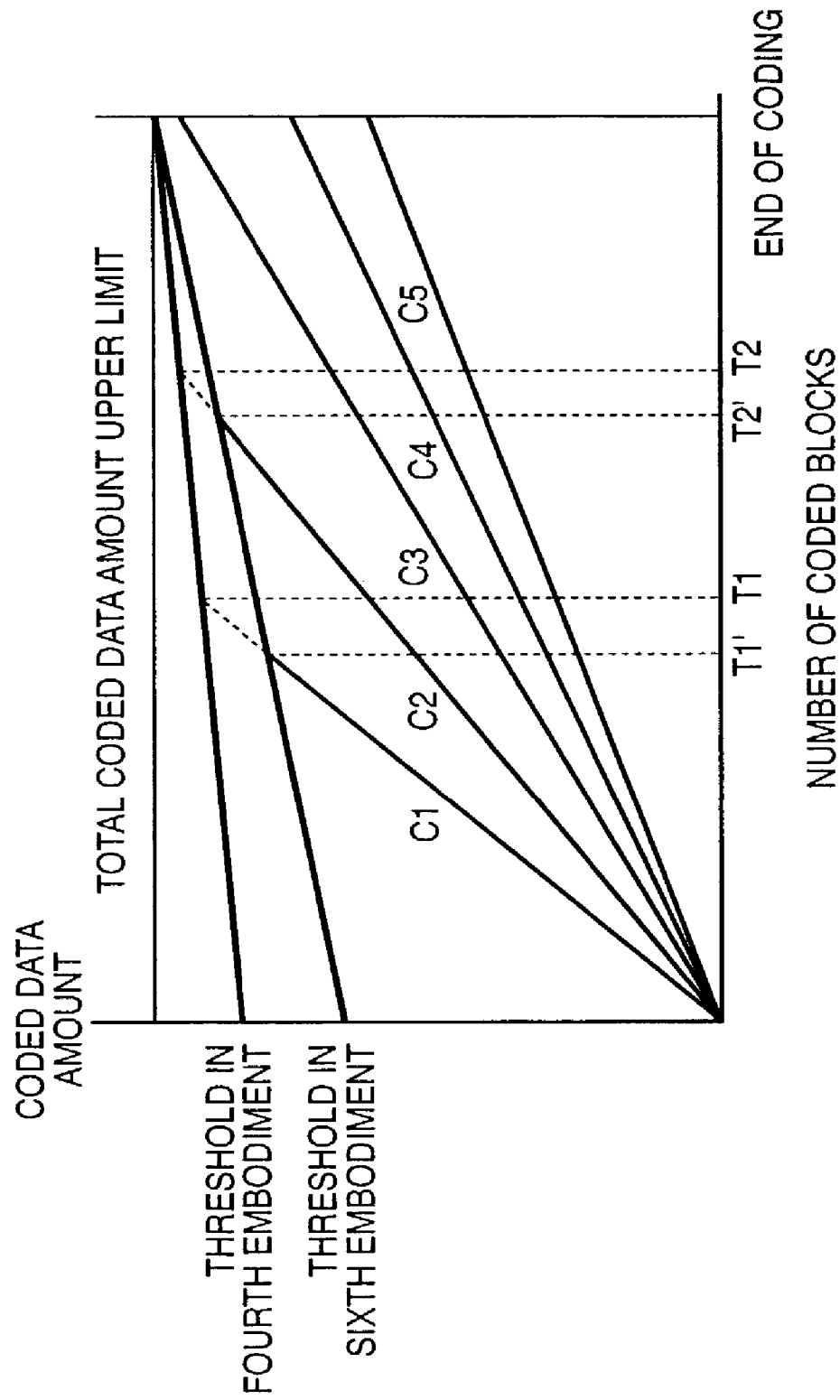
FIG. 15 is a graph showing a comparison between the threshold calculated by a threshold calculation unit 116 of an image compression coding apparatus according to the sixth embodiment of the present invention and the threshold calculated by the threshold calculation unit 116 of the image compression coding apparatus according to the fourth embodiment of the present invention.

FIG. 15 is a graph showing a comparison between the threshold calculated by the threshold calculation unit 116 of the image compression coding apparatus according to the sixth embodiment of the present invention and the threshold calculated by the threshold calculation unit 116 of the image compression coding apparatus according to the fourth embodiment of the present invention. As is obvious from the graph of FIG. 15, in the image compression coding apparatus according to the fourth embodiment, the coded data amount reaches the threshold when coding proceeds up to the block T1. In contrast to this, in the image compression coding apparatus according to the sixth embodiment, the coded data amount reaches the threshold when coding proceeds to a block T1', and hence the coding processing for a coded data C1 is aborted at an earlier timing.

In the image compression coding apparatus according to this embodiment, a threshold is calculated on the basis of the type of original to be read by the scanner, image correction information, a read noise coefficient, and image feature information, in addition to the actually/statistically measured minimum coded data amount per block. Therefore, in this apparatus, coding processing with a coding parameter with which the coded data amount will apparently exceed the total coded data amount upper limit can be aborted earlier than in the image compression coding apparatus according to the fourth embodiment. This makes it possible to further reduce the above overhead and further increase the compression coding processing speed.

As described in the second to sixth embodiments, in a system like a digital imaging device which is required to have high real-time operability and performance, when compression coding processing is to be performed while information amount control using a feedback technique with high prediction precision is realized, the image compression coding apparatus according to each of the embodiments of the present invention can obtain a coded data with the minimum coding distortion within an allowable compression ratio range while minimizing the processing time spent for a series of compression coding operations for one original image data, and more specifically, minimizing overhead associated with re-coding processing and suppressing local variations in compression coding distortion in the reconstructed image obtained by decompression/decoding processing.

<Seventh Embodiment>

Figure 18:
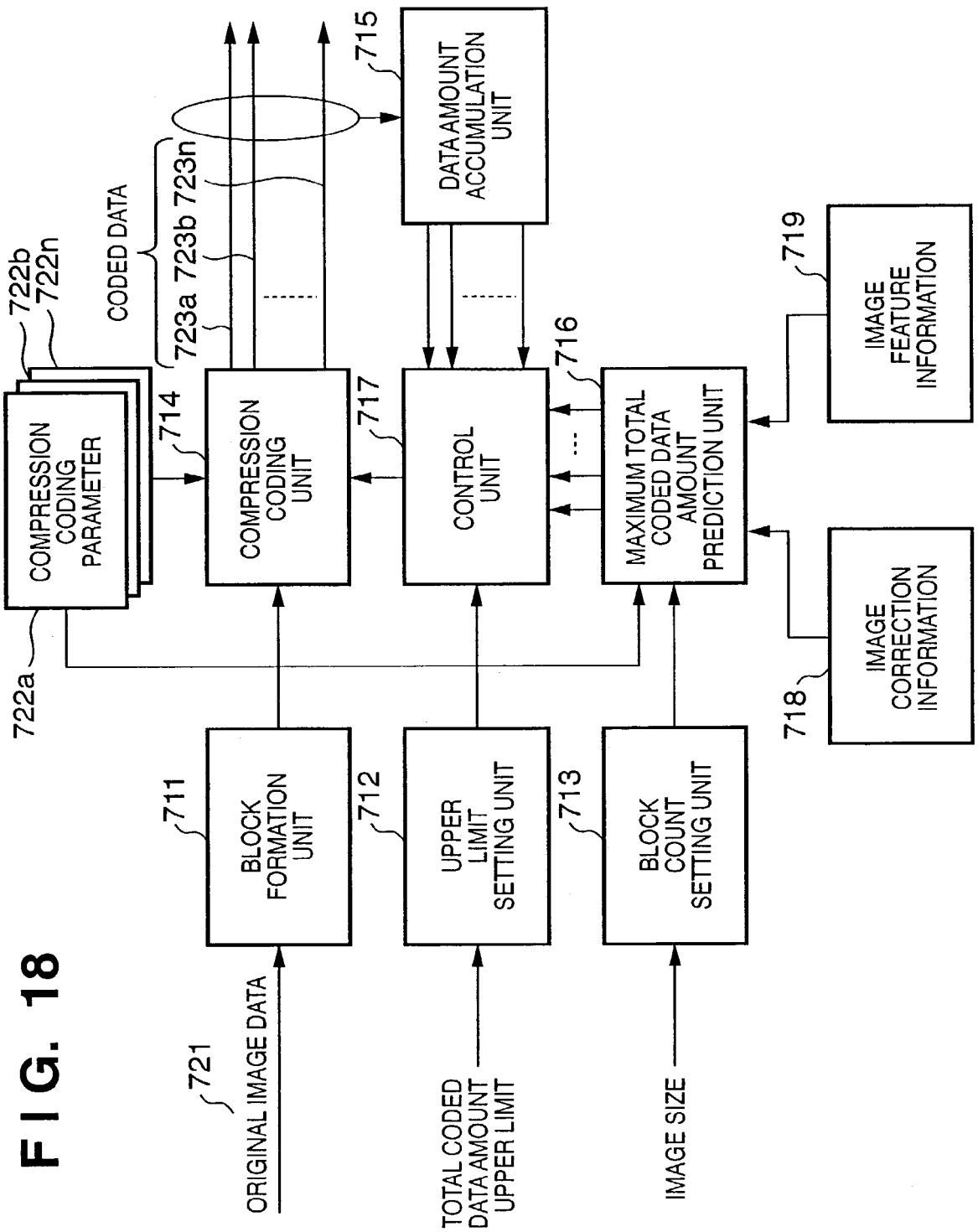
FIG. 18 is a block diagram showing the arrangement of an image compression coding apparatus according to the seventh embodiment of the present invention.

FIG. 18 is a block diagram showing the arrangement of an image compression coding apparatus according to the seventh embodiment of the present invention. As shown in FIG. 18, the image compression coding apparatus according to this embodiment is comprised of a block formation unit 711 (block formation means), upper limit setting unit 712 (upper limit setting means), block count setting unit 713 (block count setting means), compression coding unit 714 (compression coding means), data amount accumulation unit 715 (data amount accumulation means), maximum total coded data amount prediction unit 716 (maximum total coded data amount prediction means), control unit 717 (control means), and image correction information 718.

The operations of block formation unit 711 (block formation means), upper limit setting unit 712 (upper limit setting means), block count setting unit 713 (block count setting means), compression coding unit 714 (compression coding means), data amount accumulation unit 715 (data amount accumulation means) respectively correspond to those in the sixth embodiment of the present invention.

The image correction information 718 represents a parameter for image correction processing performed before original image data 721 is input. Image feature information 719 is obtained by extracting a feature from the image read by a scanner.

The maximum total coded data amount prediction unit 716 calculates the maximum code amount per block on the basis of the image correction information 718, the image feature information 719, and a coding parameter for coded data exhibiting the maximum cumulative data amount. The maximum code amount of a coding parameter with a high compression ratio is calculated to be smaller than the maximum code amount of a coding parameter with a low compression ratio. If smoothing processing has been done for an image, the maximum code amount is decreased. If edge emphasis processing has been done for an image, the maximum code amount is increased. As the number of characters or meshes in an input image increases, the code amount increases, and vice versa.

The maximum total coded data amount prediction unit 716 then calculates a maximum total coded data amount predictive value, which is a data amount obtained when the remaining blocks are coded and the coded data amounts of all the blocks are maximum, on the basis of the maximum code amount per block, the number of remaining blocks obtained from the total block count set by the block count setting unit 713 and the number of blocks that have already been compression-coded, the maximum coded data amount per block, and the cumulative data amount of a coded data exhibiting the maximum cumulative data amount among those calculated by the data amount accumulation unit 715.

The control unit 717 compares a plurality of cumulative data amounts calculated by the data amount accumulation unit 715 with the total coded data amount upper limit set in the upper limit setting unit 712. If any one of the cumulative data amounts exceeds the upper limit, processing is performed to abort the compression coding processing with the corresponding compression coding parameter. In addition, when it is determined that the maximum total coded data amount predictive value does not exceed the total coded data amount upper limit, compression coding processing with compression coding parameters other than the corresponding one is aborted.

Figure 19:
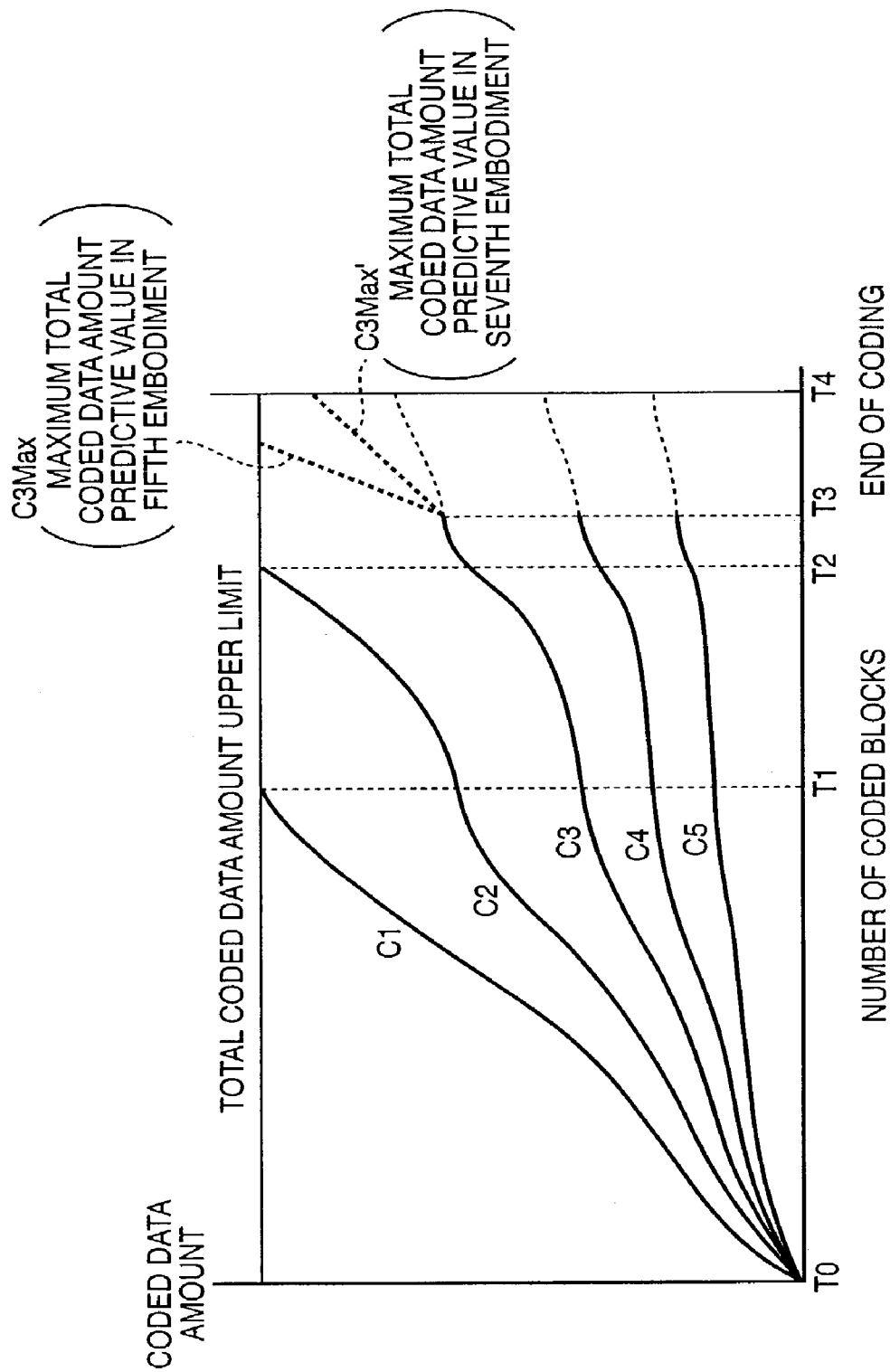
FIG. 19 is a graph for explaining a maximum total coded data amount predictive value C3Max' calculated in the image compression coding apparatus according to the seventh embodiment and a maximum total coded data amount predictive value C3Max calculated in the sixth embodiment of the present invention by comparing them with each other.

FIG. 19 is a graph for explaining a maximum total coded data amount predictive value C3Max' calculated in the image compression coding apparatus according to the seventh embodiment and the maximum total coded data amount predictive value C3Max calculated in the second embodiment of the present invention by comparing them with each other.

In the second embodiment, the maximum total coded data amount predictive value calculated at the time point coding with the coding parameter C3 is completed up to the block T3 exceeds the total coded data amount upper limit. In contrast to this, in this embodiment, since the maximum total coded data amount predictive value is calculated on the basis of a coding parameter and image correction information, the maximum total coded data amount predictive value decreases with respect to a parameter with a low compression ratio. Therefore, this value does not exceed the total coded data amount upper limit on the graph shown in FIG. 19. For this reason, since compression coding processing with coding parameters C4 and C5 is aborted at the time point coding processing is completed up to a block T3, the overhead accompanying the outputting of coded data decreases.

<Eighth Embodiment>

Figure 20:
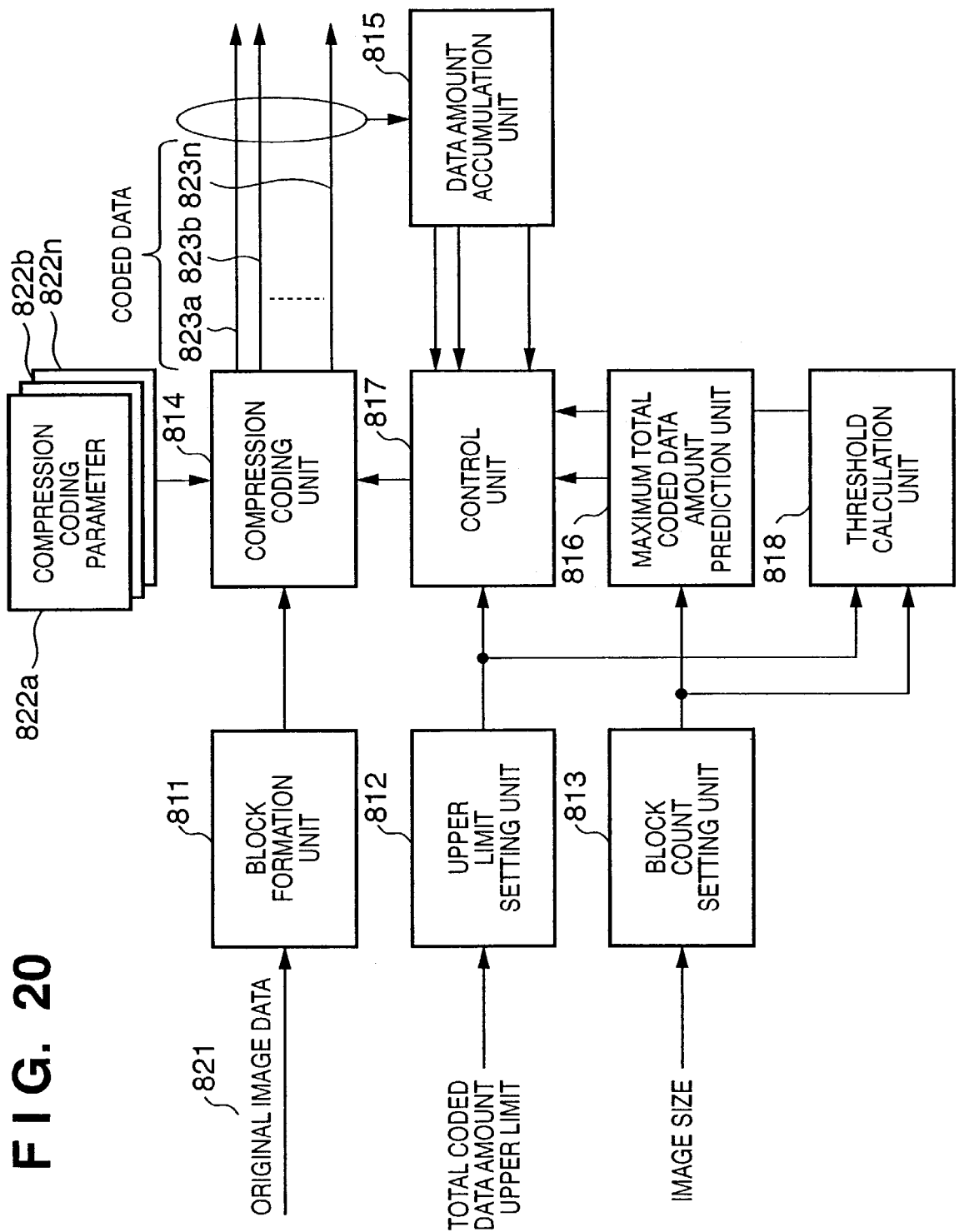
FIG. 20 is a block diagram showing the arrangement of an image compression coding apparatus according to the eighth embodiment of the present invention.

FIG. 20 is a block diagram showing the arrangement of an image compression coding apparatus according to the eighth embodiment of the present invention. The image compression coding apparatus according to this embodiment has an arrangement equivalent to a combination of the image compression coding apparatuses according to the second and fourth embodiments of the present invention.

The image compression coding apparatus according to this embodiment is comprised of a block formation unit 811 (block formation means), upper limit setting unit 812 (upper limit setting means), block count setting unit 813 (block count setting means), compression coding unit 814 (compression coding means), data amount accumulation unit 815 (data amount accumulation means), maximum total coded data amount prediction unit 816 (maximum total coded data amount prediction means), control unit 817 (control means), and threshold calculation unit 818 (threshold calculation means).

The block formation unit 811 divides original image data 821 input to the image compression coding apparatus according to this embodiment into blocks each having a predetermined size, and outputs them to the compression coding unit 814. The total coded data amount upper limit obtained when block-divided original image data completely coded is set in the upper limit setting unit 812. The block count setting unit 813 holds a block count as an image size which is determined in accordance with the size of original image data and the size of each block.

The compression coding unit 814 compression-codes the block-divided original image data by using a plurality of coding parameters 822a to 822n, and concurrently outputs a plurality of coded data 823a to 823n. The data amount accumulation unit 815 counts and accumulates the data amounts of the coded data 823a to 823n.

The maximum coded data amount prediction unit 816 calculates the maximum total coded data amount predictive value, which is a data amount obtained when the remaining blocks are coded and the code amounts of all the blocks are maximum, on the basis of the number of remaining blocks obtained from the total block count set by the block count setting unit 813 and the number of blocks that have already been compression-coded, the maximum coded data amount per block, and the cumulative code amount of a coded data exhibiting the maximum cumulative data amount among those calculated by the data amount accumulation unit 815.

The threshold calculation unit 818 calculates a coded data amount threshold on the basis of the block count set in the block count setting unit 813, the relative position of a block of the original image data which has been coded by the compression coding unit 814, the upper limit set in the upper limit setting unit 812, and the minimum code amount per block.

The control unit 817 compares a plurality of cumulative data amounts calculated by the data amount accumulation unit 815 with the coded data amount threshold calculated by the threshold calculation unit 818. If there is any amount that exceeds the upper limit, processing is performed to abort the compression coding processing with the corresponding compression coding parameter. In addition, when it is determined that the maximum total coded data predictive value will not exceed the total coded data amount upper limit, compression coding processing with parameters higher in compression ratio than the corresponding compression coding parameter is aborted.

Figure 21:
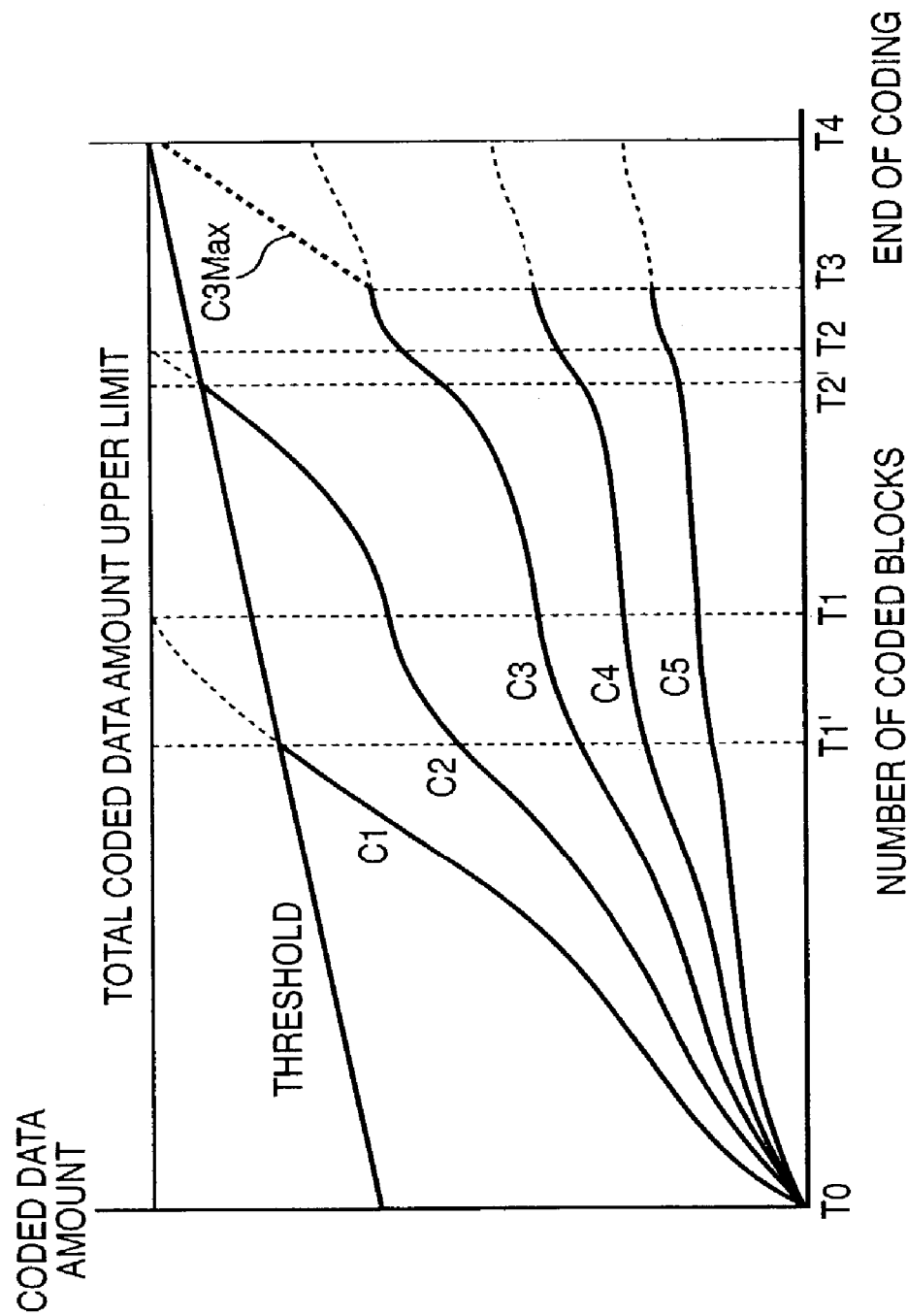
FIG. 21 is a graph showing the relationship between the total coded data amount upper limit set in an upper limit setting unit 812 in FIG. 20, the threshold calculated by a threshold calculation unit 818, the cumulative data amount (ordinate) generated by a compression coding unit 814 and calculated by a data amount accumulation unit 815, and the relative position (abscissa) of a block of the original image data which has already been compression-coded.

FIG. 21 is a graph showing the relationship between the total coded data amount upper limit set in the upper limit setting unit 812, the threshold calculated by the threshold calculation unit 818, the cumulative data amount (ordinate) generated by the compression coding unit 814 and calculated by the data amount accumulation unit 815, and the relative position (abscissa) of a block of the original image data which has already been compression-coded.

Referring to FIG. 21, reference symbol T1 denotes the number of blocks that had been coded by the time the cumulative data amount of a coded data C1 reached the total coded data amount upper limit; and T1', the number of blocks that had been coded by the time the coded data of the coded data C1 reached the threshold calculated by the threshold calculation unit 818. The image compression coding apparatus according to this embodiment aborts the compression coding processing for the coded data C1 when the coded data C1 is generated up to a block T1' and the cumulative data amount exceeds the threshold. Likewise, the coding processing is aborted at a block T2' at which C2 exceeds the threshold. In this manner, the coding processing for C1 and C2 is aborted earlier than when the cumulative data amount exceeds the total coded data amount upper limit.

When compression coding processing is completed up to a block T3, it is determined that a maximum total coded data amount predictive value C3Max does not exceed the total coded data amount upper limit, the control unit 817 aborts the compression coding processing for coded data C4 and C5 higher in compression ratio than C3. That is, in the subsequent processing, only the coded data C3 is output. When the compression coding processing is completed up to a block T4, the compression coding processing for all the blocks constituting the original image is completed. As a result, the coded data C3 is generated by the image compression coding apparatus according to this embodiment.

As described above, in the image compression coding apparatus according to this embodiment, when the cumulative data amount exceeds the threshold calculated on the basis of the minimum code amount per block, coding processing with the corresponding compression coding parameter is aborted. In addition, when it is determined that the maximum total coded data amount predictive value calculated on the basis of the maximum code amount per bock does not exceed the total coded data amount upper limit, code processing with parameters higher in compression ratio than the corresponding parameter is aborted. With the above operation, in the image compression coding apparatus according to this embodiment, the overhead accompanying the outputting of coded data is reduced.

In the description of this embodiment, the JPEG compression coding scheme has been exemplified as a compression coding scheme for image data. However, in the image compression coding apparatus of the present invention, the type of image data and its compression coding scheme are not specifically limited. For example, the image compression coding apparatus according to the present invention can also be applied to a case wherein data representing the attributes of an image, e.g., indicating whether pixels constituting an image are characters, or chromatic or achromatic, is to be runlength-compression-coded.

As described in the first to eighth embodiments, in a system like a digital imaging device which is required to have high real-time operability and performance, when compression coding processing is to be performed while information amount control using a feedback technique with high prediction precision is realized, the image compression coding apparatus according to each of the embodiments of the present invention can obtain a coded data with the minimum coding distortion within an allowable compression ratio range while minimizing the processing time spent for a series of compression coding operations for one original image data, and more specifically, minimizing overhead associated with re-coding processing and suppressing local variations in compression coding distortion in the reconstructed image obtained by decompression/decoding processing.

<Ninth Embodiment>

Figure 22:
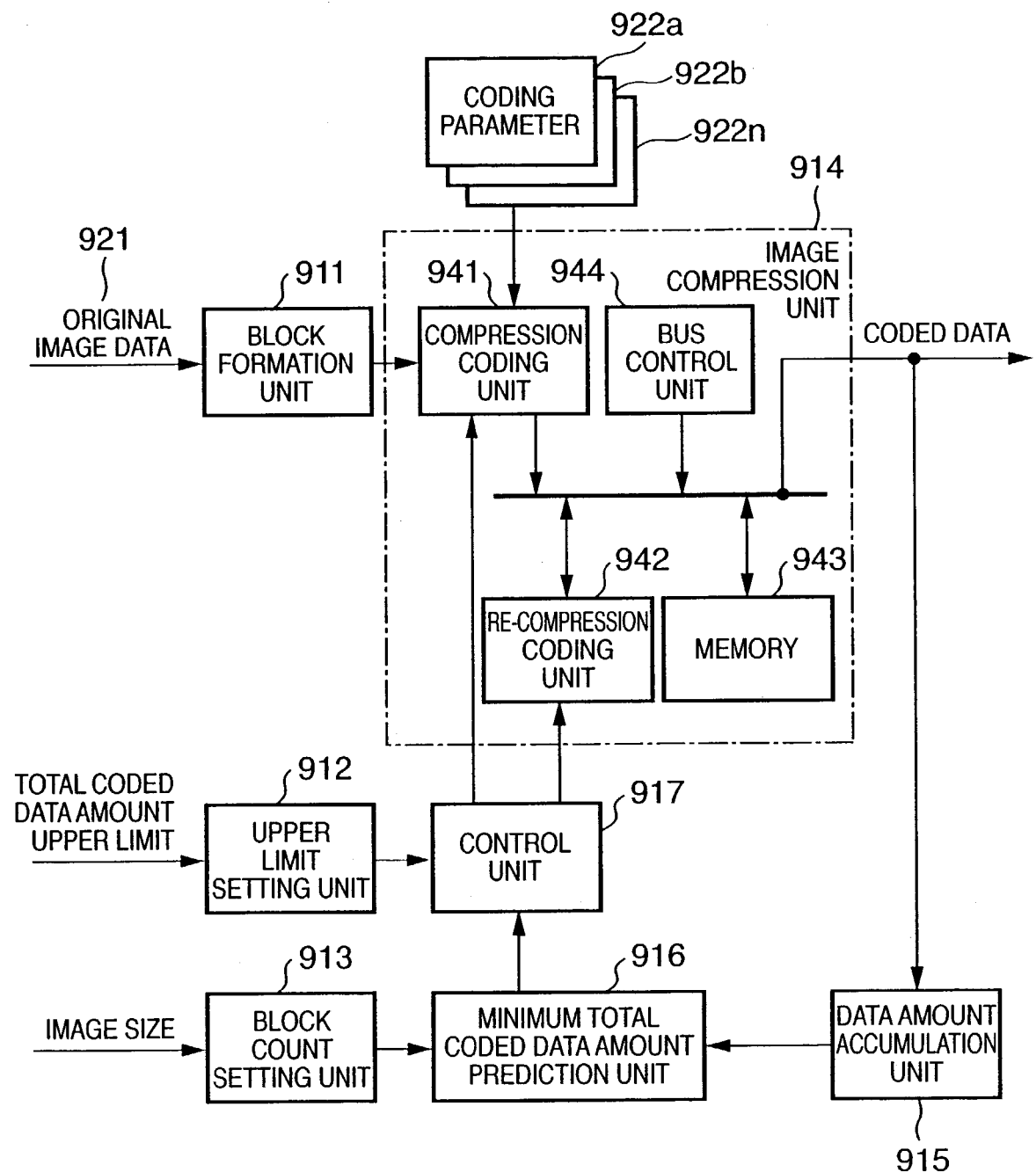
FIG. 22 is a block diagram showing the arrangement of an image compression coding apparatus according to the ninth embodiment of the present invention.

FIG. 22 is a block diagram showing the arrangement of an image compression coding apparatus according to the ninth embodiment of the present invention. The image compression coding apparatus according to this embodiment is comprised of a block formation unit 911 (block formation means), upper limit setting unit 912 (upper limit setting means), block count setting unit 913 (block count setting means), data amount accumulation unit 915 (data amount accumulation means), minimum total coded data amount prediction unit 916 (minimum total coded data amount prediction means), control unit 917 (control means), and image compression unit 914. The image compression unit 914 is comprised of a compression coding unit 941 (compression coding means), re-compression coding unit 942 (re-compression coding means), memory 943, and bus control unit 944. The image compression coding apparatus according to this embodiment will be described in detail below with reference to FIG. 22.

The compression coding unit 941 compression-codes original image data, which is divided into blocks by the block formation unit 911, by using the coding parameter designated by the control unit 917. The bus control unit 944 outputs a coded data outside the image compression unit 941 and at the same time, writes it in the memory 943. The data amount accumulation unit 915 counts and accumulates the data amounts of the coded data output from the image compression unit 914 to calculate a cumulative data amount.

The minimum total coded data amount prediction unit 916 calculates the minimum coded data amount predictive value of cumulative data amounts by the same method as that used in the minimum total coded data amount prediction unit 116 of the image compression coding apparatus according to the first embodiment.

The control unit 917 compares the minimum total coded data amount predictive value calculated by the minimum total coded data amount prediction unit 916 with the upper limit set in the upper limit setting unit 912. If the minimum total coded data amount predictive value exceeds the upper limit, the control unit 917 instructs the compression coding unit 941 to stop the compression coding processing, and instructs the re-compression coding unit 942 to re-compression-code the coded data stored in the memory 943. The bus control unit 944 inputs the coded data stored in the memory 943 to the re-compression coding unit 942. The bus control unit 944 also outputs the re-compression-coded data outside the image compression unit 914, and at the same time, starts a write operation to the memory 943.

After the execution of re-coding processing for all the blocks that had been coded by the time the minimum total coded data amount predictive value exceeded the upper limit, the control unit 917 instructs the re-compression coding unit 942 to stop the re-compression coding processing and instructs the image compression coding unit 941 to resume compression coding processing upon changing the coding parameter. Note that in the image compression coding apparatus according to this embodiment, a plurality of coded data with different compression ratios are not concurrently output.

Figure 23:
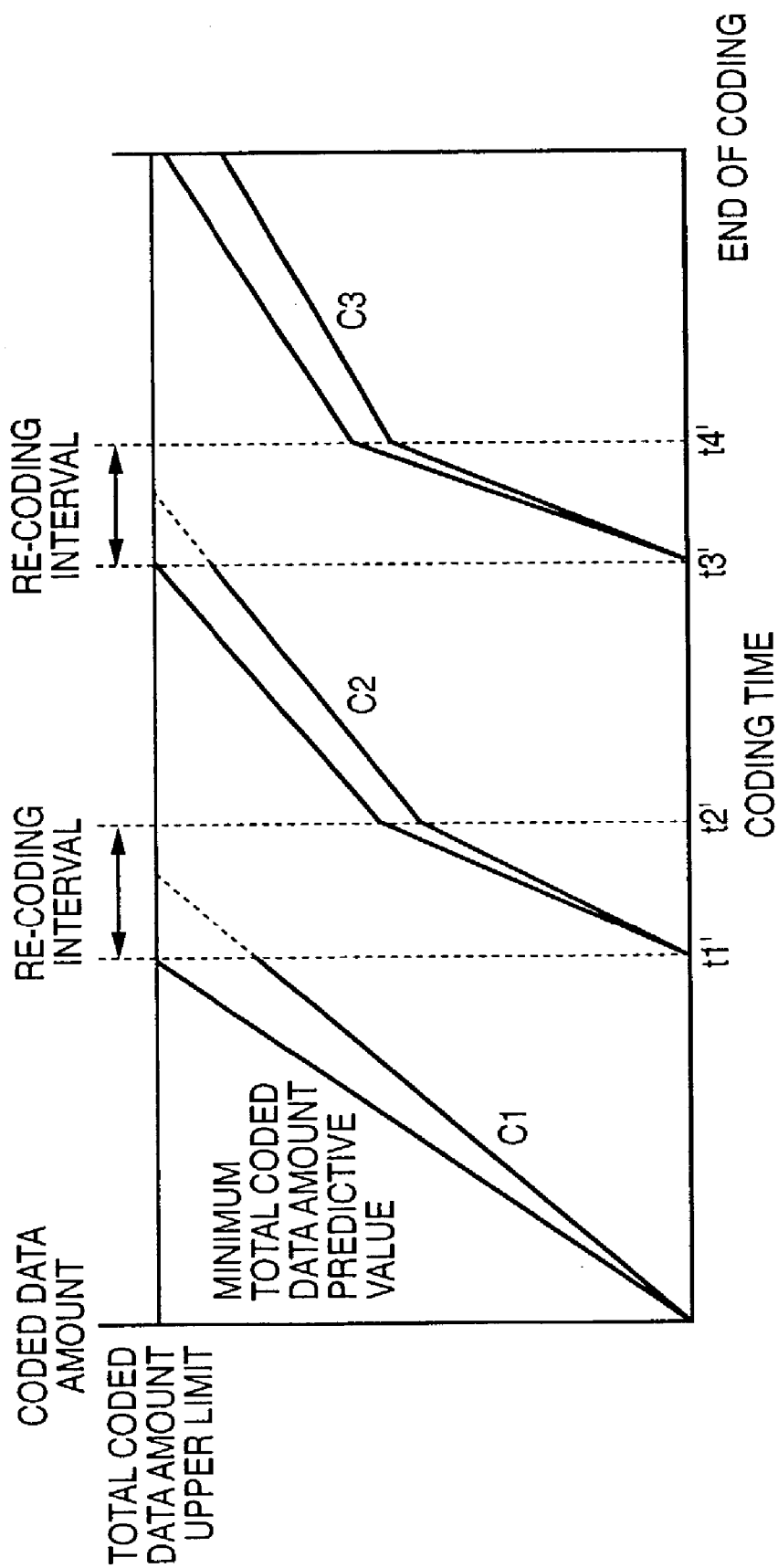
FIG. 23 is a graph showing the relationship between the cumulative coded data amount value (ordinate) calculated by a data amount accumulation unit 915 of the image compression coding apparatus according to the ninth embodiment and the time (abscissa) required for compression coding processing for an original image.

FIGS. 13 and 23 are graphs each showing the relationship between the cumulative data amount (ordinate) generated by the compression coding unit 941 and calculated by the data amount accumulation unit 915 of the image compression coding apparatus according to the ninth embodiment and the time (abscissa) required for compression coding processing for an original image. The graph of FIG. 13 shows the times required for coding processing and re-coding processing in a case wherein re-coding processing is started when the cumulative data amount reaches the total coded data amount upper limit. The graph of FIG. 23 shows the times required for coding processing and re-coding processing in a case wherein re-coding processing is started when the minimum total coded data amount predictive value exceeds the total coded data amount upper limit.

As is obvious from a comparison between the graphs of FIGS. 13 and 23, when re-coding processing is started at the time point the minimum total coded data amount predictive value exceeds the total coded data amount upper limit, the re-coding processing time becomes shorter than when re-coding processing is started at the time point the cumulative data amount exceeds the total coded data amount upper limit. Therefore, the time required for compression coding processing for the entire original image data is shortened.

As described above, in the image compression coding apparatus according to the ninth embodiment, when the minimum total coded data amount predictive value calculated on the basis of the theoretical minimum code amount per block based on the compression coding scheme exceeds the total coded data amount upper limit, the re-compression coding means is instructed to start re-compression coding. Since re-compression coding processing is started at the instant it becomes apparent that the data amount of a coded data compressed by a given compression coding parameter will exceed the total coded data amount upper limit, the overhead due to re-cording processing can be reduced. This makes it possible to increase the processing speed in performing compression coding processing while realizing information amount control by re-compression coding processing.

<10th Embodiment>

Figure 24:
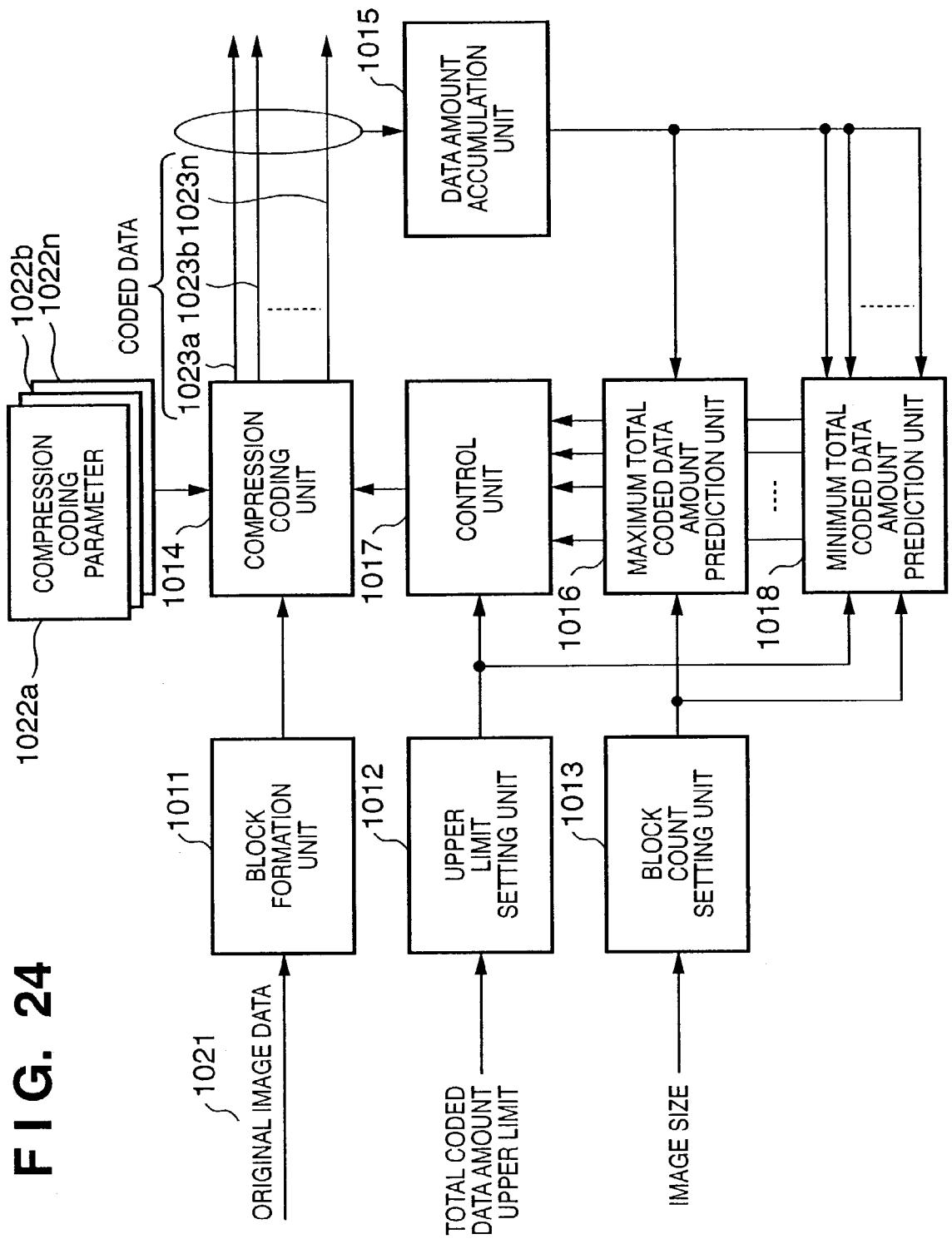
FIG. 24 is a block diagram showing the arrangement of an image compression coding apparatus according to the 10th embodiment of the present invention.

FIG. 24 is a block diagram showing the arrangement of an image compression coding apparatus according to the 10th embodiment of the present invention. The image compression coding apparatus according to this embodiment has an arrangement equivalent to a combination of the image compression coding apparatuses according to the first and second embodiments of the present invention.

The image compression coding apparatus according to this embodiment is comprised of a block formation unit 1011 (block formation means), upper limit setting unit 1012 (upper limit setting means), block count setting unit 1013 (block count setting means), compression coding unit 1014 (compression coding means), data amount accumulation unit 1015 (data amount accumulation means), maximum total coded data amount prediction unit 1016 (maximum total coded data amount prediction means), control unit 1017 (control means), and minimum total coded data amount prediction unit 1018 (minimum total coded data amount prediction means).

The block formation unit 1011 divides original image data 1021 input to the image compression coding apparatus of this embodiment into blocks each having a predetermined size, and outputs them to the compression coding unit 1014. The total coded data amount upper limit obtained when block-divided original image data completely coded is set in the upper limit setting unit 1012. The block count setting unit 1013 holds a block count as an image size which is determined in accordance with the size of original image data and the size of each block.

The compression coding unit 1014 compression-codes the block-divided original image data by using a plurality of coding parameters 1022a to 1022n, and outputs a plurality of coded data 1023a to 1023n. The data amount accumulation unit 1015 counts and accumulates the data amounts of the coded data 1023a to 1023n output from the compression coding unit 1014.

The maximum coded data amount prediction unit 1016 calculates the maximum total coded data amount predictive value, which is a data amount obtained when the remaining blocks are coded and the coded data amounts of all the blocks are maximum, on the basis of the number of remaining blocks obtained from the total block count set by the block count setting unit 1013 and the number of blocks that have already been compression-coded, the maximum code amount per block, and the cumulative data amount of a coded data exhibiting the maximum cumulative data amount among those calculated by the data amount accumulation unit 1015.

The minimum total coded data amount prediction unit 1018 calculates the minimum total coded data amount predictive value by the same method as that used in the minimum total coded data amount prediction unit 216 of the first embodiment of the present invention.

The control unit 1017 compares the total coded data amount upper limit with the minimum total coded data amount predictive values calculated by the minimum total coded data amount prediction unit 1018. If any one of these values exceeds the upper limit, the control unit 1017 performs processing to abort the compression coding processing using the corresponding compression coding parameter. In addition, upon determining that the maximum total coded data amount predictive value does not exceed the total coded data amount upper limit, the control unit 1017 aborts compression coding processing with parameters higher in compression ratio than the corresponding compression coding parameter.

Figure 25:
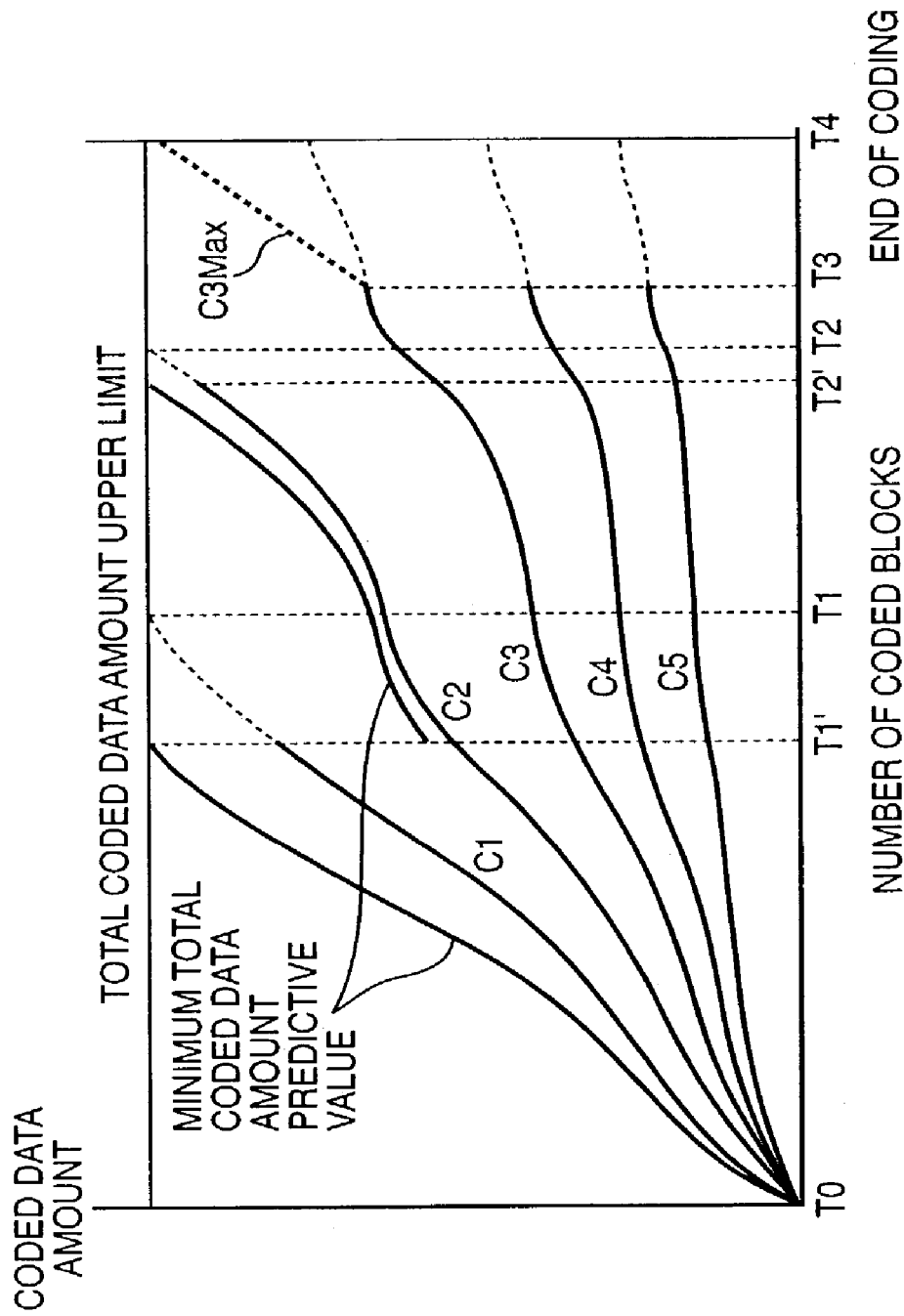
FIG. 25 is a graph showing the relationship between the total coded data amount upper limit set in an upper limit setting unit 1012 in FIG. 24, the minimum total coded data amount predictive value calculated by a minimum total coded data amount prediction unit 1018, the cumulative data amount (ordinate) calculated by a data amount accumulation unit 1015, and the relative position (abscissa) of a block of the original image data which has already been compression-coded.

FIG. 25 is a graph showing the relationship between the total coded data amount upper limit set in the upper limit setting unit 1012, the minimum total coded data amount predictive value calculated by the minimum total coded data amount prediction unit 1018, the cumulative data amount (ordinate) generated by the compression coding unit 1014 and calculated by the data amount accumulation unit 1015, and the relative position (abscissa) of a block of the original image data which has already been compression-coded.

Referring to FIG. 25, reference symbol T1 denotes the number of blocks that had been coded by the time the cumulative data amount of a coded data C1 reached the total coded data amount upper limit; and T1', the number of blocks that had been coded by the time the minimum total coded data amount predictive value calculated by the minimum total coded data amount prediction unit 1018 reached the upper limit. The image compression coding apparatus according to this embodiment aborts the compression coding processing for the coded data C1 when the coded data C1 is generated up to a block T1' and the minimum total coded data amount predictive value exceeds the upper limit. Likewise, the coding processing is aborted at a block T2' at which C2 exceeds the threshold. In this manner, the coding processing for C1 and C2 is aborted earlier than when the minimum total coded data amount predictive value exceeds the total coded data amount upper limit.

When compression coding processing is completed up to a block T3, it is determined that a maximum total coded data amount predictive value C3Max does not exceed the total coded data amount upper limit, the control unit 517 aborts the compression coding processing for coded data C4 and C5 higher in compression ratio than C3. That is, in the subsequent processing, only the coded data C3 is output. When the compression coding processing is completed up to a block T4, the compression coding processing for all the blocks constituting the original image is completed. As a result, the coded data C3 is generated by the image compression coding apparatus according to this embodiment.

As described above, in the image compression coding apparatus according to this embodiment, when the minimum total coded data amount predictive value calculated on the basis of the minimum code amount per block exceeds the total coded data amount upper limit, coding processing with the corresponding compression coding parameter is aborted. In addition, when it is determined that the maximum total coded data amount predictive value calculated on the basis of the maximum code amount per bock does not exceed the total coded data amount upper limit, code processing with parameters higher in compression ratio than the corresponding parameter are aborted. With the above operation, in the image compression coding apparatus according to this embodiment, the overhead accompanying the outputting of coded data is reduced.

<11th Embodiment>

Figure 26:
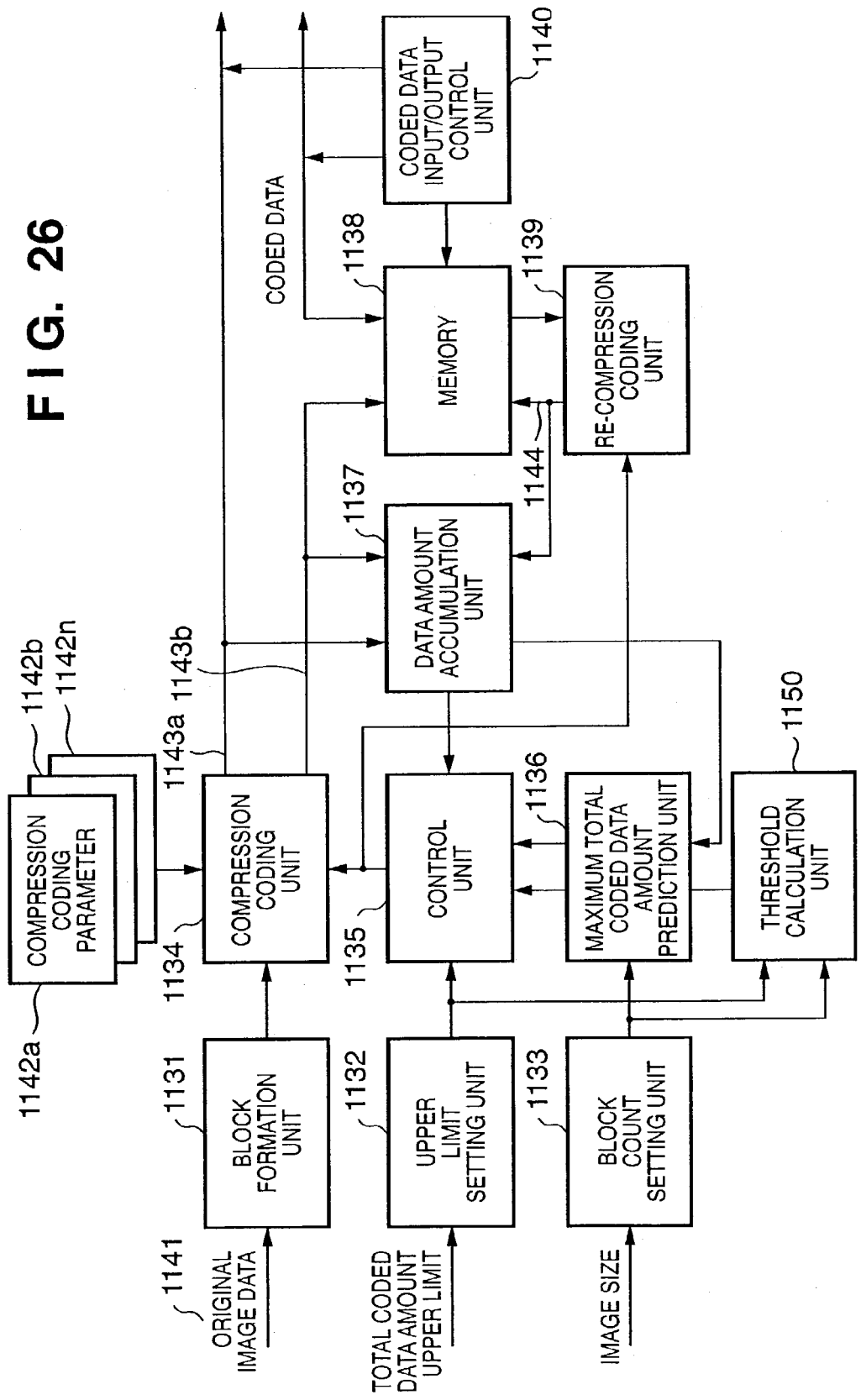
FIG. 26 is a block diagram showing the arrangement of an image compression coding apparatus according to the 11th embodiment of the present invention.

FIG. 26 is a block diagram showing the arrangement of an image compression coding apparatus according to the 11th embodiment of the present invention. The image compression coding apparatus according to this embodiment has an arrangement equivalent to a combination of the image compression coding apparatuses according to the third and fifth embodiments of the present invention.

As shown in FIG. 26, the image compression coding apparatus according to this embodiment is comprised of a block formation unit 1131 (block formation means), upper limit setting unit 1132 (upper limit setting means), block count setting unit 1133 (block count setting means), compression coding unit 1134 (compression coding means), control unit 1135 (control means), maximum total coded data amount prediction unit 1136 (maximum total coded data amount prediction means), data amount accumulation unit 1137 (data amount accumulation means), memory 1138 (storage means), re-compression coding unit 1139 (re-compression coding means), coded data input/output control unit 1140 (output control means), and threshold calculation unit 1150 (threshold calculation means).

The image compression coding apparatus according to this embodiment will be described in detail below with reference to FIG. 26. The block formation unit 1131 divides an original image data 1141 input to the image compression coding apparatus into blocks each having a predetermined size, and outputs them to the compression coding unit 1134. The total coded data amount upper limit obtained when block-divided original image data completely coded is set in the upper limit setting unit 1132. The block count setting unit 1133 holds a block count as an image size which is determined in accordance with the size of original image data and the size of each block.

The compression coding unit 1134 compression-codes the original image, which is divided into blocks each having the predetermined size by the block formation unit 1131, by using compression coding parameters, of compression coding parameters 1142a to 1142n, which are designated by the control unit 1135, and outputs coded data 1143a and 1143b. Note that the coded data 1143b is higher in compression ratio than the coded data 1143a. The coded data 1143a is output outside the image compression coding apparatus. The coded data 1143b is output to the memory 1138.

The re-compression coding unit 1139 re-compression coding the coded data temporarily stored in the memory 1138 and outputs a coded data 1144. The data amount accumulation unit 1137 counts and accumulates the data amounts of the coded data 1143a, 1143b, and 1144 to calculate cumulative data amounts. In this case, the cumulative coded data amount values of the coded data 1143b and 1144 are added, and the resultant value is output to the maximum total coded data amount prediction unit 1136.

The maximum total coded data amount prediction unit 1136 calculates the maximum total coded data amount predictive value which is a data amount obtained when the remaining blocks constituting the original image are coded and the coded data amounts of all the blocks are maximum on the basis of the number of remaining blocks obtained from the total block count set by the block count setting unit 1133 and the number of blocks that have already been compression-coded, the maximum coded data amount per block, and the sum of the cumulative data amount values of the coded data 1143b and 1144 which is obtained from the data amount accumulation unit 1137.

The threshold calculation unit 1150 calculates a threshold on the basis of the block count set in the block count setting unit 1133, the relative position of a block of the original image which has been coded by the compression coding unit 1134, the upper limit set in the upper limit setting unit 1132, and the minimum code amount per block by using the same method as that used in the threshold calculation unit 116 of the image compression coding apparatus according to the fourth embodiment of the present invention.

In addition, the control unit 1135 performs the following processing if it is determined upon comparison that the cumulative data amount of the coded data 1143a calculated by the data amount accumulation unit 1137 exceeds the threshold calculated by the threshold calculation unit 1150.

If the maximum total coded data amount predictive value exceeds the total coded data amount upper limit, the control unit 1135 changes the compression coding parameters to be used to generate the coded data 1143a and 1143b and instructs the re-compression coding unit 1139 to re-compression-code the coded data temporarily stored in the memory 1138. The control unit 1135 then instructs the coded data input/output control unit 1140 to perform control to output the coded data temporarily stored in the memory 1138 outside the image compression coding apparatus according to this embodiment and control to input/output coded data to/from the re-compression coding unit 1139.

If the maximum total coded data amount predictive value does not exceed the total coded data amount upper limit, the control unit 1135 changes the compression coding parameter to be used to generate the coded data 1143a and aborts the generation of the coded data 1143b. The control unit 1135 then instructs the coded data input/output control unit 1140 to output the coded data temporarily stored in the memory 1138 outside the image compression coding apparatus according to this embodiment. In this case, the re-compression coding unit 1139 performs no re-compression coding processing.

Figure 27:
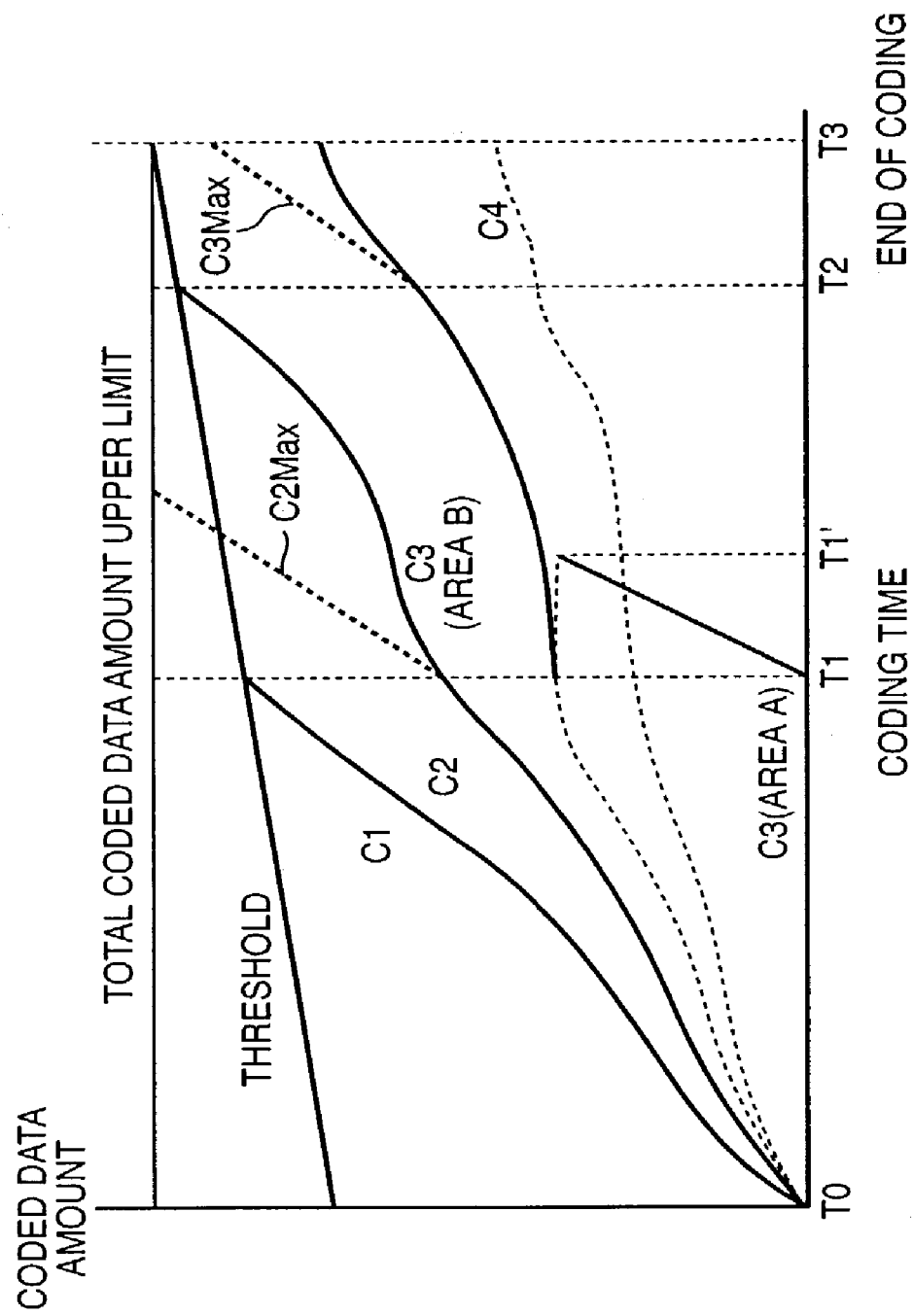
FIG. 27 is a graph for explaining the relationship between the cumulative coded data amount value (ordinate) of the coded data generated by the image compression coding apparatus according to the 11th embodiment and the time (abscissa) required for compression coding processing for an original image.

The time required for the image compression coding apparatus of this embodiment to perform compression coding processing for an original image will be described below. FIG. 27 is a graph for explaining the relationship between the cumulative coded data amount value (ordinate) of the coded data generated by the image compression coding apparatus according to the 11th embodiment and the time (abscissa) required for compression coding processing for an original image. FIG. 8 is a view showing relative positions T0, T1, T2, and T3 of blocks, on the original image, which have been compression-coded at times t0, t1, t2, and t3 on the graph in FIG. 7, and three divided areas A, B, and C on two-dimensionally expressed original image data.

A coded data C1 is output outside the image compression coding apparatus according to this embodiment until time t1 on the graph of FIG. 27. A coded data C2 is then temporarily stored in the memory 1138 in FIG. 26. When compression coding processing is completed up to the block T1 of the original image data in FIG. 8 (i.e., time t1 in FIG. 27), the cumulative data amount of the coded data C1 exceeds the threshold calculated by the threshold calculation unit 1150.

At this time, a maximum total coded data amount predictive value C2Max of the coded data C2 which is calculated by the maximum total coded data amount prediction unit 1136 exceeds the total coded data amount upper limit. Assume therefore that the total coded data amount obtained when the original image in FIG. 8 is completely coded may exceed the total coded data amount upper limit.

In this case, the control unit 1135 of the image compression coding apparatus according to this embodiment aborts the compression coding processing of generating the coded data C1, and performs control to start compression coding processing of generating the coded data C2 and a coded data C3 from a block following the block T1.

The control unit 1135 also instructs the re-compression coding unit 1139 to re-compression-code the coded data C2 obtained by coding the original image portion in the area A in FIG. 8 which has been stored in the memory 1138 so as to generate the coded data C3, and to store it in the memory 1138 again. The coded data input/output control unit 1140 outputs the coded data C2 obtained by coding the original image portion in the area A in FIG. 8, which has been stored in the memory 1138, outside the image compression coding apparatus according to the present invention. After time t1 in FIG. 27, the coded data C2 is output outside the image compression coding apparatus according to the present invention, and the coded data C3 is temporarily stored in the memory 1138.

At time t2, at which image data have been coded up to the block T2 in FIG. 8, the cumulative data amount of the coded data C2 in FIG. 27 exceeds the threshold. The control unit 1135 therefore aborts the generation of the coded data C2. At this time, a maximum total coded data amount predictive value C3Max calculated by the maximum total coded data amount prediction unit 1136 does not exceed the total coded data amount upper limit. Even if, therefore, all the data in the area C (FIG. 8) for which coding processing has not been completed at time t2 are coded, the total coded data amount of the coded data C3 does not exceed the total coded data amount upper limit.

The control unit 1135 therefore issues neither an instruction to start compression coding processing of generating a coded data C4 in FIG. 27 nor an instruction to perform re-compression coding processing for the coded data C3 obtained by coding the data in the areas A and B in FIG. 8. The coded data input/output control unit 1140 outputs the coded data C3 in the areas A and B temporarily stored in the memory 1138.

When compression coding processing is completed up to the block T3, compression coding processing for all the blocks constituting the original image is completed, and the coded data C3 is generated by the image compression coding apparatus according to this embodiment.

With the above processing, when the cumulative data amount exceeds the threshold calculated on the basis of the minimum code amount, the image compression coding apparatus according to this embodiment aborts the coding processing with the corresponding parameter and starts re-coding processing. In addition, upon determining that the total coded data amount does not exceed the preset upper limit, the apparatus aborts coding processing with coded data other than the corresponding coded data string. Consequently, since the number of coded data to be output from the compression coding unit 1134 decreases, the overhead accompanying transfer of coded data outside the image compression coding apparatus decreases, as described in association with the connection between the external memory and the image compression coding apparatus according to the first embodiment shown in FIG. 5. In addition, since no re-compression coding processing is performed in the above case, no coded data is transferred between the re-compression coding unit 1139 and memory 1138, and hence the overhead accompanying the outputting of coded data decreases.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes readout from the storage medium are written in the memory of a function expansion board inserted into the computer or a function expansion unit connected to the computer, and the CPU of the function expansion board or function expansion unit performs part or all of actual processing on the basis of the instructions of the program codes.

When the above recording medium is to be applied to the present invention, program codes corresponding to the flow chart described above are stored in the recording medium.

As has been described above, according to the present invention, in a system like a digital imaging device which is required to have high real-time operability and performance, when compression coding processing is to be performed while information amount control using a feedback technique with high prediction precision is realized, a coded data with little coding distortion can be obtained within an allowable compression ratio range while a deterioration in the performance of the system is minimized.

The present invention is not limited to the above embodiments and various changes and modifications can be made within the spirit and scope of the present invention. Therefore, to apprise the public of the scope of the present invention, the following claims are made.

What is claimed is:

1. An image encoding apparatus comprising:
dividing means for dividing input image data into blocks each having a predetermined size;
encoding means for encoding the image data for each divided block using a plurality of encoding parameters and concurrently outputting a plurality of encoded data;
calculating means for calculating cumulative data amounts of the each of encoded image data for the respective coded blocks before encoding of the image data is complete;
setting means for setting a total encoded data amount upper limit for the image data;
prediction means for calculating maximum total coded data amount predictive values of the each of encoded data, which are to be obtained when the image data is completely encoded, on the basis of a maximum encoded data amount per a predetermined number of blocks and the cumulative data amounts before encoding of the image data is complete; and control means for, when the cumulative data amount exceeds the upper limit, performing processing to abort compression coding processing with a corresponding encoding parameter, and when the maximum total encoded data amount predictive value does not exceed the upper limit, performing processing to abort encoding processing with an encoding parameter higher in compression ratio than a corresponding encoding parameter.

2. The apparatus according to claim 1, wherein the maximum encoded data amount per the predetermined number of blocks is a data amount per a predetermined number of blocks of the input image.

3. The apparatus according to claim 1, wherein the maximum encoded data amount per the predetermined number of blocks is calculated for each of the encoding parameters.

4. A control method for an image encoding apparatus which performs encoding processing for input image data, comprising:

a dividing step of dividing the image data into blocks each having a predetermined size;

an encoding step of encoding the image data for each divided block using a plurality of encoding parameters and concurrently outputting a plurality of encoded data;

a calculating step of calculating cumulative data amounts of the each of encoded image data for the respective coded blocks before encoding of the image data is complete;

a setting step of setting a total encoded data amount upper limit for the image data;

a prediction step of calculating maximum total coded data amount predictive values of the each of encoded data, which are to be obtained when the image data is completely encoded, on the basis of a maximum encoded data amount per a predetermined number of blocks and the cumulative data amounts before encoding of the image data is complete; and a control step of, when the cumulative data amount exceeds the upper limit, performing processing to abort compression coding processing with a corresponding encoding parameter, and when the maximum total encoded data amount predictive value does not exceed the upper limit, performing processing to abort encoding processing with an encoding parameter higher in compression ratio than a corresponding encoding parameter.

5. An image encoding apparatus comprising:

an input unit adapted to input image data;

an encoding unit adapted to simultaneously perform a plurality of encoding processes on the image data, each encoding process encoding at different compression rates;

a first control unit adapted to control the encoding unit to halt one of plurality of encoding processes, when a volume of encoded data, which has been cumulatively encoded by the one of the plurality of encoding processes, reaches a predetermined maximum value; and a second control unit adapted to, upon finding an encoding process of the plurality of encoding processes, which is predicted not to exceed the predetermined maximum value, control the encoding unit to halt the other encoding processes that compress the image data at rates below the found encoding process.

6. An image encoding method comprising:

an input step of inputting image data;

an encoding step of simultaneously performing a plurality of encoding processes on the image data, each encoding process encoding at different compression rates;

a first control step of controlling the encoding unit to halt one of plurality of encoding processes, when a volume of encoded data, which has been cumulatively encoded by the one of the plurality of encoding processes, reaches a predetermined maximum value; and a second control step of, upon finding an encoding process of the plurality of encoding processes, which is predicted not to exceed the predetermined maximum value, controlling the encoding unit to halt the other encoding processes that compress the image data at rates below the found encoding process.

* * * * *

UNITED STATES PATENT AND TRADEMARK OFFICE
CERTIFICATE OF CORRECTION

PATENT NO.         : 7,215,818 B2
APPLICATION NO. : 10/379655
DATED              : May 8, 2007
INVENTOR(S)        : Satoshi Naito It is certified that error appears in the above-identified patent and that said Letters Patent is hereby corrected as shown below:

ON COVER PAGE [56] REFERENCES CITED

Line 1, Other Publications, "Complaint" should read --Compliant--.

COLUMN 5

Line 11, "is comprising" should read --comprises--;
    Line 29, "is comprising" should read --comprises--; and
    Line 53, "is comprising" should read --comprises--.

COLUMN 6

Line 7, "is comprising" should read --comprises--; and
    Line 32, "is comprising" should read --comprises--.

COLUMN 7

Line 4, "is comprising" should read --comprises--;
    Line 36, "is comprising" should read --comprises--; and
    Line 66, "is comprising" should read --comprises--.

COLUMN 9

Line 33, "view how" should read --view of how--.

COLUMN 11

Line 13, "data" should read --data is--.

COLUMN 13

Line 33, "data" should read --data is--.

UNITED STATES PATENT AND TRADEMARK OFFICE
CERTIFICATE OF CORRECTION

PATENT NO. : 7,215,818 B2
APPLICATION NO. : 10/379655
DATED : May 8, 2007
INVENTOR(S) : Satoshi Naito It is certified that error appears in the above-identified patent and that said Letters Patent is hereby corrected as shown below:

COLUMN 17

Line 12, "data" should read --data is--.

COLUMN 20

Line 22, "data" should read --data is--.

COLUMN 21

Line 63, "view how" should read --view of how--.

COLUMN 22

Line 51, "number" should read --number of--.

COLUMN 24

Line 5, "has" should read --has been--; and
Line 12, "re-cording" should read --re-coding--.

COLUMN 25

Line 4, "of" (first occurrence) should read --of a--.

COLUMN 27

Line 67, "data" should read --data is--.

COLUMN 31

Line 12, "re-cording" should read --re-coding--; and
Line 43, "data" should read --data is--.

UNITED STATES PATENT AND TRADEMARK OFFICE
CERTIFICATE OF CORRECTION

PATENT NO. : 7,215,818 B2
APPLICATION NO. : 10/379655
DATED : May 8, 2007
INVENTOR(S) : Satoshi Naito It is certified that error appears in the above-identified patent and that said Letters Patent is hereby corrected as shown below:

COLUMN 33

Line 34, "data" should read --data is--; and
  Line 50, "coding" should read --codes--.

COLUMN 36

Line 58, "the each of" should read --each of the--; and
  Line 64, "the each of" should read --each of the--.

COLUMN 37

Line 29, "the each of" should read --each of the--; and
  Line 35, "the each of" should read --each of the--.

COLUMN 38

Line 15, "of" (first occurrence) should read --of the--; and
  Line 31, "of" (first occurrence) should read --of the--.

Signed and Sealed this

Twenty-fourth Day of February, 2009

JOHN DOLL
*Acting Director of the United States Patent and Trademark Office*